(12) United States Patent
Nakamae

(10) Patent No.: US 11,211,067 B2
(45) Date of Patent: *Dec. 28, 2021

(54) ELECTRONIC DEVICE AND CONTROL METHOD

(71) Applicant: Dynabook Inc., Tokyo (JP)

(72) Inventor: Midori Nakamae, Hino Tokyo (JP)

(73) Assignee: DYNABOOK INC., Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 16/396,541

(22) Filed: Apr. 26, 2019

(65) Prior Publication Data

US 2020/0098359 A1    Mar. 26, 2020

(30) Foreign Application Priority Data

Sep. 20, 2018  (JP) .............................. JP2018-176127

(51) Int. Cl.
*G10L 15/22* (2006.01)
*G10L 15/08* (2006.01)
*G10L 15/32* (2013.01)

(52) U.S. Cl.
CPC .............. *G10L 15/22* (2013.01); *G10L 15/08* (2013.01); *G10L 15/32* (2013.01); *G10L 2015/088* (2013.01); *G10L 2015/223* (2013.01)

(58) Field of Classification Search
CPC ......... G10L 15/22; G10L 15/08; G10L 15/32; G10L 2015/088; G10L 2015/223
See application file for complete search history.

(56) References Cited

U.S. PATENT DOCUMENTS

| 9,530,410 | B1* | 12/2016 | LeBeau | ................... G10L 15/22 |
| 2010/0076753 | A1 | 3/2010 | Doi et al. | |
| 2011/0131040 | A1* | 6/2011 | Huang | ................ B60R 16/0373 |
| | | | | 704/231 |
| 2018/0286414 | A1* | 10/2018 | Ravindran | .............. G10L 25/24 |

FOREIGN PATENT DOCUMENTS

| JP | S61-128330 A | 6/1986 |
| JP | S62-127800 A | 6/1987 |
| JP | 2010-072578 A | 4/2010 |
| JP | 2014-191295 A | 10/2014 |
| JP | 2016-076007 A | 5/2016 |
| JP | 2018-124484 A | 8/2018 |

\* cited by examiner

*Primary Examiner* — Sonia L Gay
(74) *Attorney, Agent, or Firm* — Knobbe, Martens, Olson & Bear LLP

(57) ABSTRACT

According to one embodiment, an electronic device includes a transceiver and a hardware processor. The transceiver establishes a wired connection or a wireless connection between the electronic device and a wearable device wearable by a user. The hardware processor receives voice data generated by collecting speech of the user from the wearable device. The hardware processor performs a process to recognize one of one or more first commands from the voice data when a first mode is set as a voice recognition mode, performs a process to recognize one of second commands from the voice data when a second mode is set as the voice recognition mode, and repeatedly performs a process to recognize one of third commands from the voice data when a third mode is set as the voice recognition mode.

10 Claims, 16 Drawing Sheets

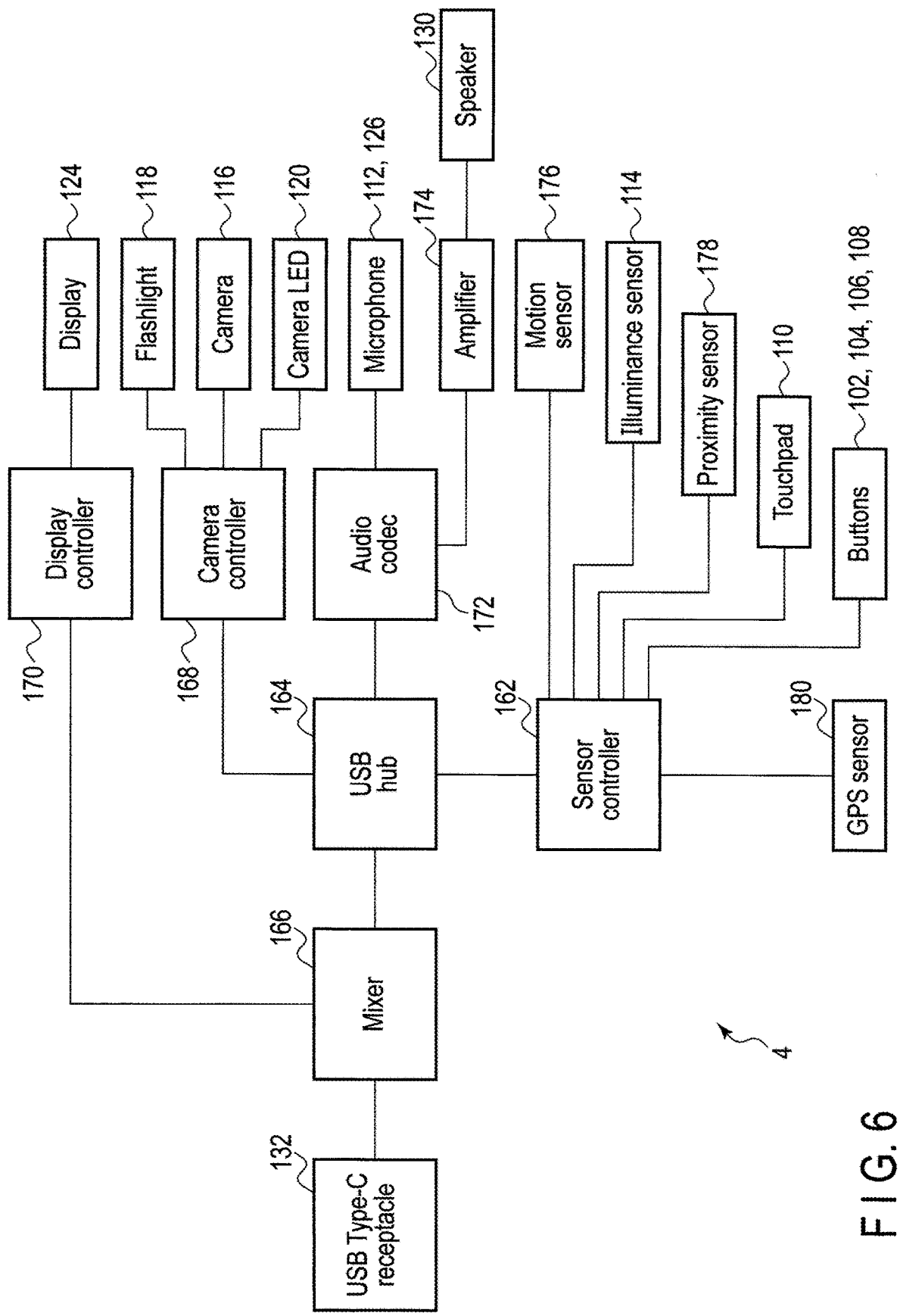
F I G. 6

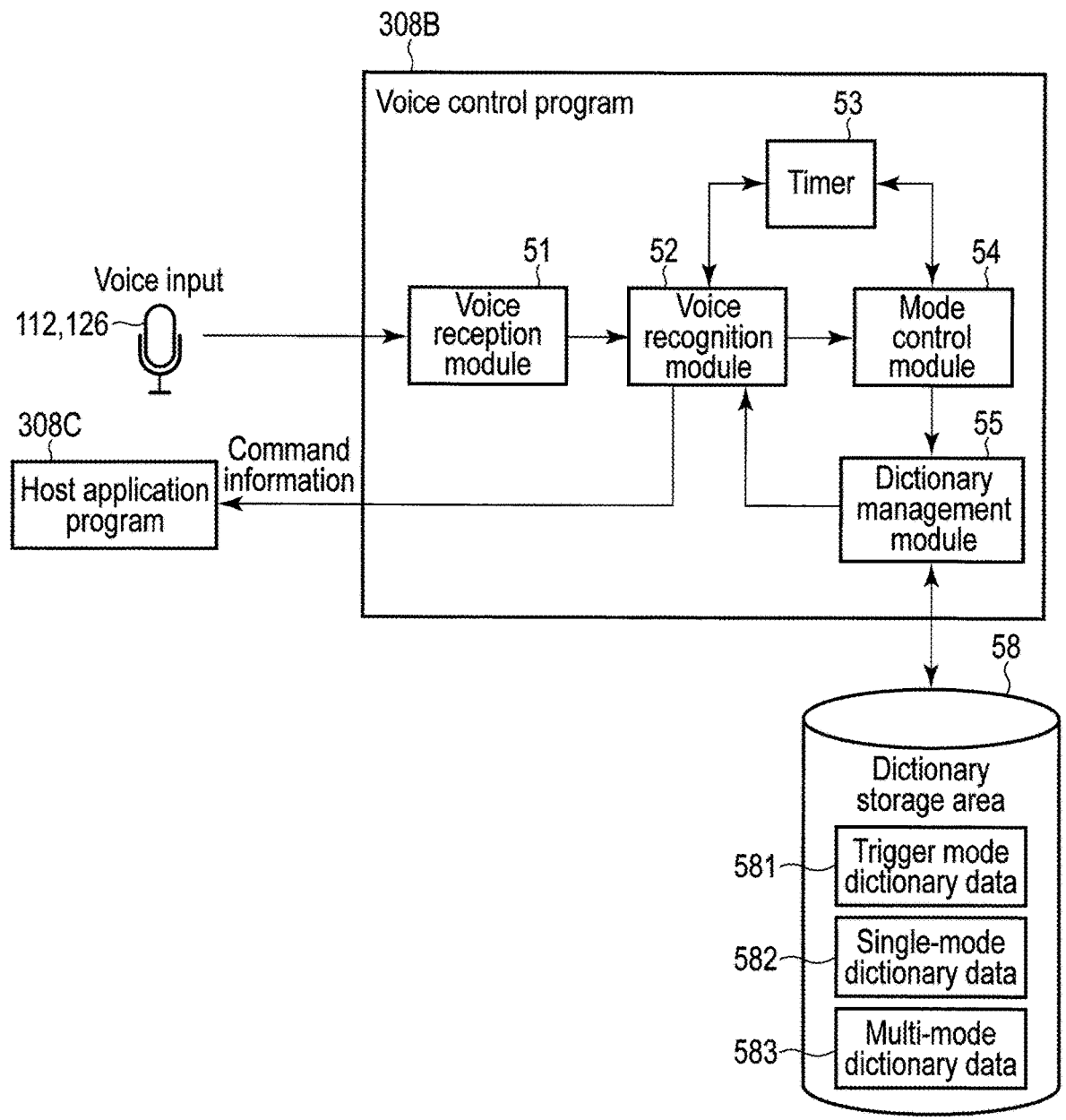
F I G. 7

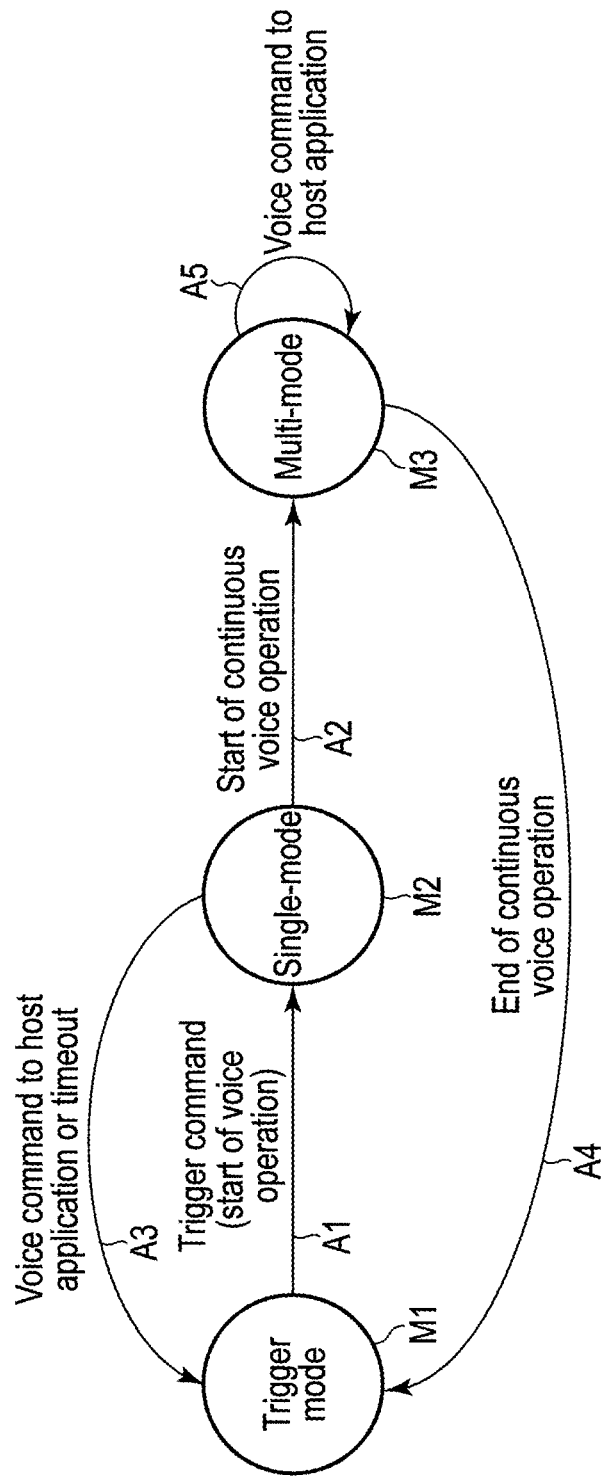
F I G. 8

| Trigger command ID | Content |
|---|---|
| Trigger command 1 | Start voice operation | ~1-1

FIG. 9

| Command ID | Content |
|---|---|
| Command 1 | Press shutter release button | ~2-1
| Command 2 | Zoom in | ~2-2
| Command 3 | Zoom out | ~2-3
| Command 4 | Start continuous voice operation | ~2-4
| ... | ... |

FIG. 10

| Command ID | Content |
|---|---|
| Command 1 | Press shutter release button | ~3-1
| Command 2 | Zoom in | ~3-2
| Command 3 | Zoom out | ~3-3
| Command 5 | End continuous voice operation | ~3-4
| ... | ... |

FIG. 11

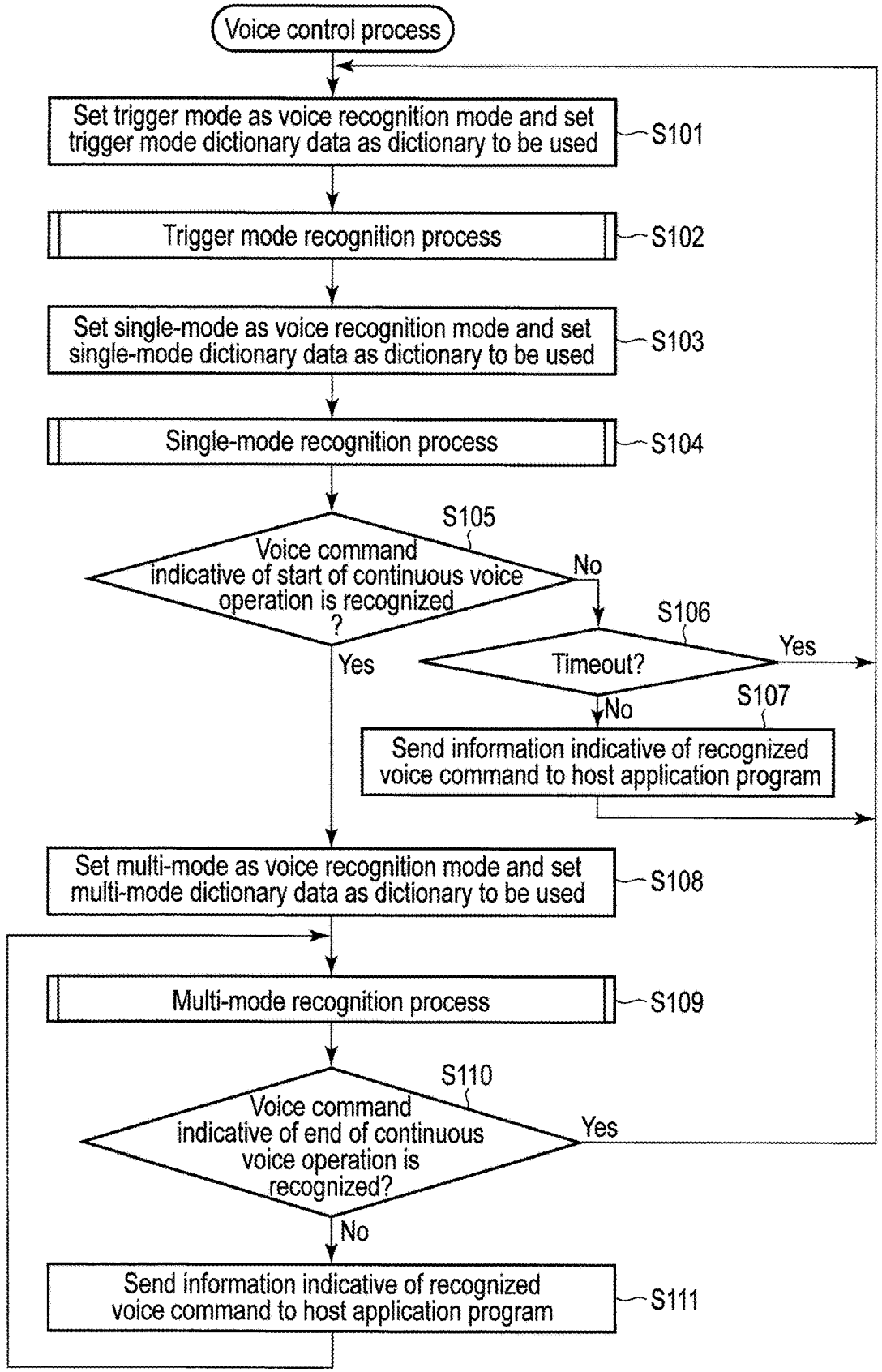
F I G. 12

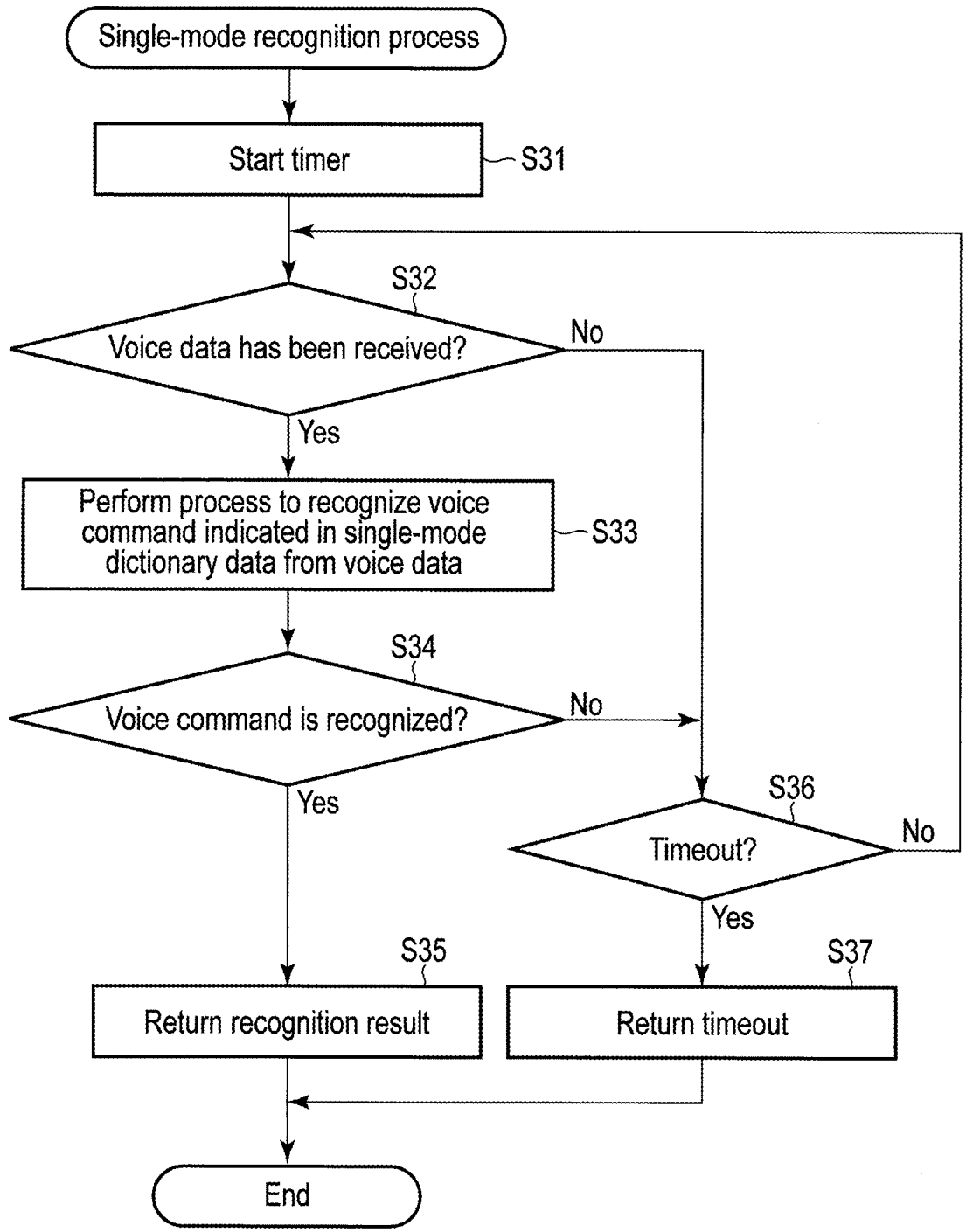
F I G. 14

| Trigger command ID | Content |
|---|---|
| Trigger command 1 | Start voice operation | — 5-1
| Trigger command 2 | Start continuous voice operation | — 5-2
| ... | ... |

F I G. 18

| Command ID | Content |
|---|---|
| Command 1 | Press shutter release button | — 6-1
| Command 2 | Zoom in | — 6-2
| Command 3 | Zoom out | — 6-3
| ... | ... |

F I G. 19

| Command ID | Content |
|---|---|
| Command 1 | Press shutter release button | — 7-1
| Command 2 | Zoom in | — 7-2
| Command 3 | Zoom out | — 7-3
| Command 4 | End continuous voice operation | — 7-4
| ... | ... |

F I G. 20

ELECTRONIC DEVICE AND CONTROL METHOD

CROSS-REFERENCE TO RELATED APPLICATIONS

This application is based upon and claims the benefit of priority from Japanese Patent Application No. 2018-176127, filed Sep. 20, 2018, the entire contents of which are incorporated herein by reference.

FIELD

Embodiments described herein relate generally to an electronic device and a control method.

BACKGROUND

Recently, an IoT (Internet of Things) age in which many things are connected through the Internet has come. A technique called "edge computing" is required as a tool for network communication and information sharing in offices, factories, and in other various situations. In order to realize the edge computing, development of a practical mobile edge computing device (MECD) having high degrees of versatility and processing capacity, and can be used by an operator (user) on site, is needed separately from a data center (or cloud). Thereby, it is expected that promotion of the operational efficiency and productivity improvement at a workplace and the like, or load dispersion of data and improvement in a network environment and the like, will be achieved.

Mobile devices such as MECD may be used with any wearable device such as an eyeglass-type equipment and a bracelet-type equipment. The mobile device and the wearable device exchange data, so that the mobile device can process data generated by, for example, a camera or a sensor in the wearable device.

When a user performs a hands-free work while carrying a mobile device and wearing a wearable device such as an eyeglasses-type or bracelet-type wearable device, the mobile device and/or the wearable devices may be operated using voice data of speech of the user collected by a microphone. Through the operation with voice, no input device such as a keyboard or a mouse connected to the mobile device is required. Thus, the user can work efficiently.

In a voice recognition device such as a smart speaker, a certain word (trigger word) that triggers a voice operation is recognized, and then one command is recognized, for example. That is, the voice recognition device allows a user to speak one command after speaking a trigger word. However, there is a case where a user wants to speak multiple commands continuously after speaking a trigger word.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 6 is a block diagram illustrating an example of the system configuration of the main body of the wearable device of FIG. 1.

FIG. 7 is a block diagram illustrating an example of the functional configuration of a voice control program executed by the electronic device of the first embodiment.

FIG. 8 illustrates an example of transition of a voice recognition mode in the electronic device of the first embodiment.

FIG. 9 illustrates a configuration example of trigger mode dictionary data used in the electronic device of the first embodiment.

FIG. 10 illustrates a configuration example of single-mode dictionary data used in the electronic device of the first embodiment.

FIG. 11 illustrates a configuration example of multi-mode dictionary data used in the electronic device of the first embodiment.

FIG. 12 is a flowchart of an example of the procedure of a voice control process executed by the electronic device of the first embodiment.

FIG. 14 is a flowchart of an example of the procedure of a single-mode recognition process executed by the electronic device of the first embodiment.

FIG. 18 illustrates a configuration example of trigger mode dictionary data used in the electronic device of the second embodiment.

FIG. 19 illustrates a configuration example of single-mode dictionary data used in the electronic device of the second embodiment.

FIG. 20 illustrates a configuration example of multi-mode dictionary data used in the electronic device of the second embodiment.

DETAILED DESCRIPTION

Figure 1:
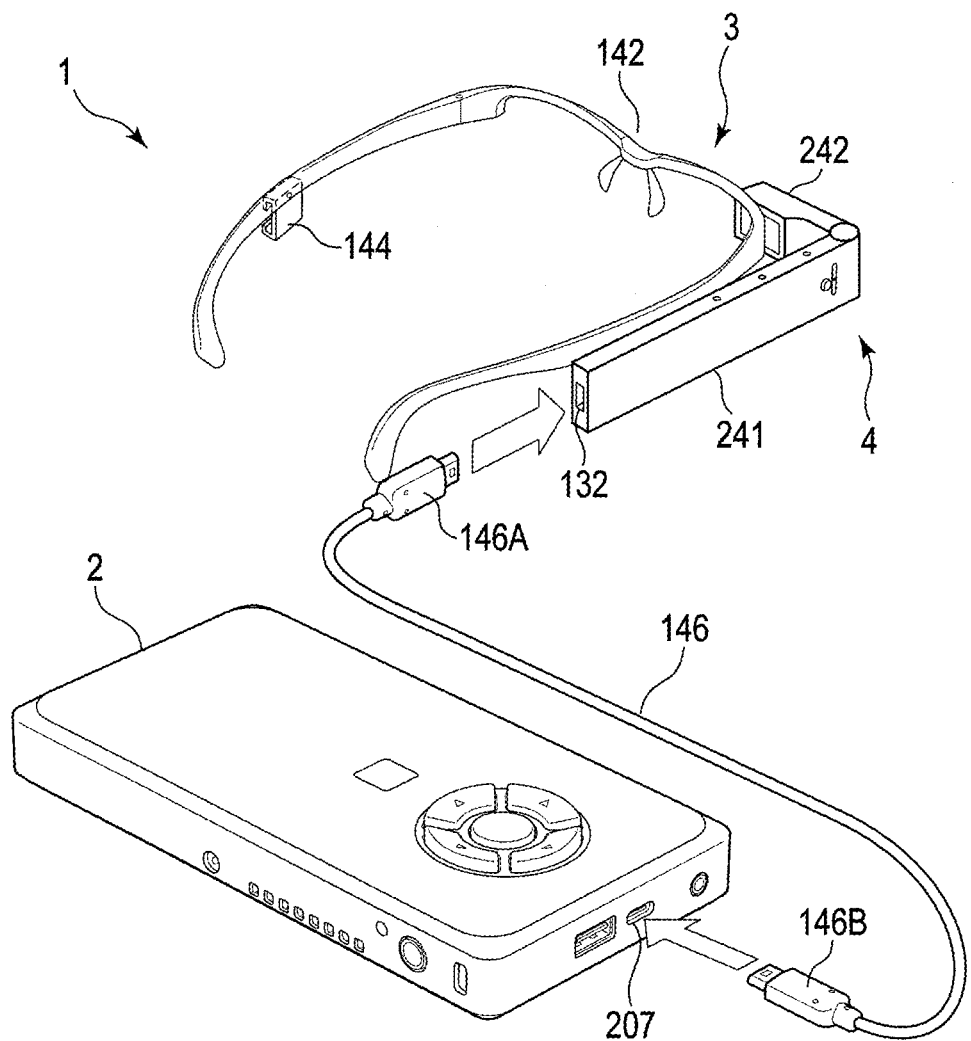
FIG. 1 is a perspective view illustrating an example of the external appearance of an electronic apparatus (mobile PC) according to a first embodiment and a main body of a wearable device connected to the electronic apparatus.

Various embodiments will be described hereinafter with reference to the accompanying drawings.

In general, according to one embodiment, an electronic device includes a transceiver and a hardware processor. The transceiver establishes a wired connection or a wireless connection between the electronic device and a wearable device wearable by a user. The hardware processor receives voice data generated by collecting speech of the user from the wearable device. The hardware processor performs a process to recognize one of one or more first commands from the voice data when a first mode is set as a voice recognition mode. The hardware processor performs a process to recognize one of second commands from the voice data when a second mode is set as the voice recognition mode. The hardware processor repeatedly performs a process to recognize one of third commands from the voice data when a third mode is set as the voice recognition mode.

Hereinafter, embodiments will be described with reference to the drawings. Note that the disclosure is merely an example, and the invention is not limited by the content described in the following embodiments. Naturally, the modifications easily conceivable by those skilled in the art are included in the scope of the disclosure. In order to make the description clearer, there are cases where the size, shape, etc., of each part in the drawings are schematically represented by changing them relative to the actual embodiment. In multiple drawings, corresponding elements are denoted by the same reference numerals, and a detailed explanation may be omitted.

First Embodiment

[Control System]

First, with reference to FIG. 1, a configuration of a control system 1 that includes an electronic apparatus according to a first embodiment will be described. This electronic apparatus is a portable wireless device that may be implemented as a mobile personal computer (PC) including a mobile edge computing device (MECD), or a mobile information terminal such as a smartphone, a mobile phone, a PDA, and the like. Hereinafter, a case where this electronic apparatus is realized as a mobile PC 2 will be exemplified.

The control system 1 includes the mobile PC 2 and a wearable device 3. A user carries the mobile PC 2 and wears the wearable device 3. The wearable device 3 is wearable on a user's body (for example, the arm, the neck, the head, etc.). As the wearable device 3, a wearable device of a glass-type, a bracelet-type, a wristwatch-type, a headphone-type, or the like may be used. In the following, it is assumed that the wearable device 3 is a glass-type wearable device.

The wearable device 3 includes an eyeglass frame 142 and a wearable device main body 4. The eyeglass frame 142 may have a shape obtained by removing a lens from general eyeglasses, and is mounted on the face of an operator. The eyeglass frame 142 may have a structure to which eyeglasses are attached. In a case where an operator regularly uses eyeglasses, lenses having the same power as those of regularly used eyeglasses may be attached to the eyeglass frame 142.

The wearable device main body 4 is composed of a side part 241 to be along the temple of the eyeglass frame 142, and a front part 242 to be positioned on the line of sight of one eye of the operator. The angle that the front part 242 forms with the side part 241 is adjustable.

The mobile PC 2 and the wearable device 3 establish a wired connection and/or a wireless connection to communicate. In the example shown in FIG. 1, a cable 146 connects the mobile PC 2 and the wearable device 3. This cable 146 is, for example, a cable that conforms to USB type-C (registered trademark) standard. The mobile PC 2 may communicate with the wearable device 3 by various wireless communication methods such as wireless LAN or Bluetooth (registered trademark).

As shown in FIG. 1, at the rear end of the side part 241 of the wearable device main body 4, a USB Type-C standard receptacle 132 to which a plug 146A at one end of the cable 146 is to be inserted is provided. A plug 146B at the other end of the cable 146 is inserted into a receptacle 207 that conforms to USB Type-C standard provided on the upper end face of the mobile PC 2. As described above, the wearable device main body 4 is connected to the mobile PC 2 through the USB type-C cable 146, and various signals are exchanged between the wearable device main body 4 and the mobile PC 2. The plugs and the receptacles may be replaced with each other in accordance with the design or the like, and they may be referred to as connectors. The wearable device main body 4 may also be connected to the mobile PC 2 by means of wireless communication such as a wireless LAN, Bluetooth, and the like.

In the embodiment, the wearable device main body 4 does not include a battery or DC terminal serving as a drive power supply, and the drive power is supplied from the mobile PC 2 to the wearable device main body 4 through the USB type-C cable 146. However, the wearable device main body 24 may also include a drive power supply.

[Mobile PC 2]

Figure 2:
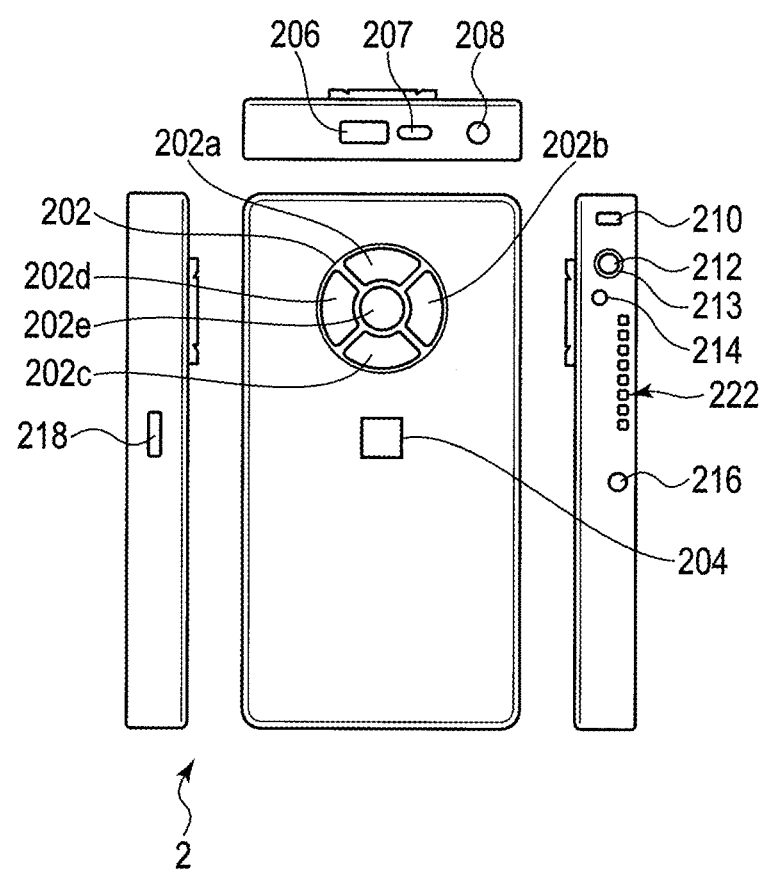
FIG. 2 illustrates the external appearance of a front surface, side surfaces, and an upper surface of the electronic apparatus of the first embodiment.

FIG. 2 shows an example of the external appearance of the mobile PC 2. The mobile PC 2 is a small-sized PC that can be held by one hand, and has a small size and is lightweight, e.g., a width thereof is about 10 cm or less, height thereof is about 18 cm or less, thickness thereof is about 2 cm, and weight thereof is about 300 g. Accordingly, the mobile PC 2 can be held in a pocket of a work clothing of the operator, a holster to be attached to a belt, or a shoulder case, and is wearable. Although the mobile PC 2 includes a semiconductor chip such as a CPU, a semiconductor memory, and the like, and a storage device such as a Solid State Disk (SSD), and the like, the mobile PC 2 does not include a display device and a hardware keyboard for input of characters.

On the front surface of the mobile PC 2, cursor buttons 202 composed of an up button 202a, a right button 202b, a down button 202c, a left button 202d, and a decision button 202e (also called a center button or an enter button) are arranged, and a fingerprint sensor 204 is arranged below the cursor buttons 202. Since the mobile PC 2 does not include a hardware keyboard for input of characters, a password number (also called a PIN) cannot be input with the hardware keyboard. Therefore, the fingerprint sensor 204 is used for user authentication at the time of login of the mobile PC 2. Each of the cursor buttons 202A may be used for inputting a command to instruct the mobile PC 2 to perform a corresponding process.

Operation methods of the cursor buttons 202 are determined by programs.

For example, when the decision button 202e is pressed once, item selection/item execution is carried out, when the decision button 202e is pressed for a long time, ending or cancellation of an operation is carried out, when the up button 202a is pressed once, the cursor is moved upward, when the up button 202a is pressed for a long time, a list of application programs being executed is displayed, when the down button 202c is pressed once, the cursor is moved downward, when the down button 202c is pressed for a long time, a menu of quick settings is displayed, when the left button 202d is pressed once, the right icon is selected, and when the right button 202b is pressed once, the left icon is selected.

On the upper side face of the mobile PC 2, a USB 3.0 receptacle 206, a USB type-C receptacle 207, and an audio jack 208 are provided.

On one side face (e.g., the side face on the left side when viewed from the front) of the mobile PC 2, a memory card slot 218 for a memory card is provided. The memory card includes, for example, an SD card, a micro SD card (registered trademark), and the like.

On the other side face (e.g., the side face on the right side when viewed from the front) of the mobile PC 2, a slot 210 for Kensington Lock (registered trademark), a power switch 212, a power LED 213, a DC IN/battery LED 214, a DC terminal 216, and ventilation holes 222 for cooling are provided. The power LED 213 is arranged around the power switch 212, and is turned on while the mobile PC 2 is being powered on. The DC IN/battery LED 214 indicates the state of the mobile PC 2 such as whether the battery is being charged, and the remaining battery level. Although power from the battery may drive the mobile PC 2, power from the AC adaptor, which is connected to the DC terminal 216, may also drive the mobile PC 2. Although not shown, the back side of the mobile PC 2 is configured such that the battery can be replaced with a new one by a one-touch operation.

Figure 3:
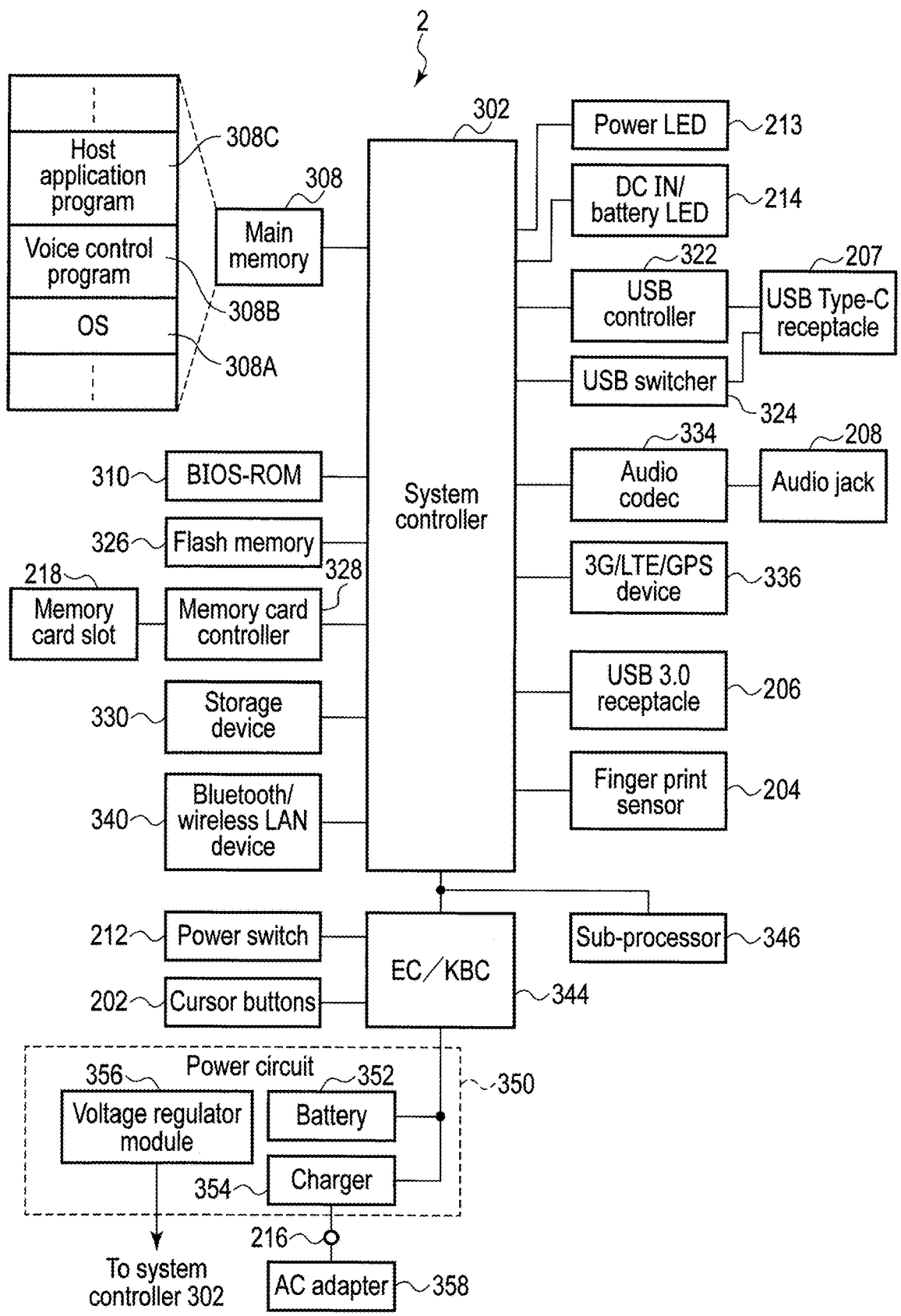
FIG. 3 is a block diagram illustrating an example of the system configuration of the electronic apparatus of the first embodiment.

FIG. 3 shows an example of the system configuration of the mobile PC 2. The mobile PC 2 includes a system controller 302. The system controller 302 includes a processor (CPU) and a controller hub. A main memory 308, a BIOS-ROM 310, the power LED 213, the DC IN/battery 214, and a USB controller 322 are connected to the processor. A flash memory 326, a memory card controller 328, a storage device 330 including an HDD or an SSD, a USB switch 324, an audio codec 334, a 3G/LTE/GPS device 336, the finger print sensor 204, a USB 3.0 receptacle 206, a Bluetooth/wireless LAN device 340, and an EC/KBC 344 are connected to the controller hub.

The system controller 302 executes various programs loaded from the storage device 330 into the main memory 308. The system controller 302 controls the operation of each component in the mobile PC 2 by executing instructions in the programs.

The programs include an OS 308A, a voice control program 308B, and various application programs 308C. The voice control program 308B has a function to control the mobile PC 2 and the wearable device 3 with a command spoken by a user. The voice control program 308B supplies various commands spoken by the user to, for example, an active application program (also referred to as a host application program) 308C that is currently being executed on the mobile PC 2 and is operable by the user. That is, the voice control program 308B and the host application program 308C operate in cooperation. Each command is a single word or a simple sentence and is defined by a dictionary used by the voice control program 308B.

The audio codec 334 converts a digital audio signal to be played into an analog audio signal and supplies the converted analog signal to the audio jack 208. Further, the audio codec 334 converts an analog audio signal input from the audio jack 208 into a digital audio signal.

The memory card controller 328 accesses a memory card (for example, an SD card) inserted into the memory card slot 218, and controls reading/writing of data from/to the memory card.

The USB controller 322 controls transmission and reception of data with respect to either a USB Type-C cable that includes a plug connected to the USB Type-C receptacle 207 or a USB 3.0 cable (not shown) that includes a plug connected to the USB 3.0 receptacle 206. A type of interface that is not provided in the mobile PC 2, such as USB, HDMI (registered trademark) and the like can be used by connecting a USB hub or a port extension adapter to the USB Type-C receptacle 207.

The Bluetooth/wireless LAN device 340 executes wireless communication conforming to the Bluetooth standard or wireless LAN communication conforming to IEEE802.11 standard for connection to an external device or a network. For the connection to the network, not only wireless communication but also wired LAN communication conforming to the IEEE802.3 standard may be used. The USB controller 322 or the Bluetooth/wireless LAN device 340 may function as a transceiver to establish a wired or wireless connection between the mobile PC 2 and the wearable device 3.

The fingerprint sensor 204 is used for fingerprint authentication at the time of boot of the mobile PC 2.

A sub-processor 346, the power switch 212 and the cursor buttons 202 are connected to the EC/KBC 344. The EC/KBC 344 has a function of turning on or turning off the power to the mobile PC 2 in response to the operation of the power switch 212. The control of power-on and power-off is executed by the cooperative operation of the EC/KBC 344 and power circuit 350. Even during a power-off period of the mobile PC 2, the EC/KBC 344 operates by the power from a battery 352 or an AC adaptor 358 connected as an external power supply. The power circuit 350 uses the power from the battery 352 or the AC adaptor 358 thereby to control power to be supplied to each component. The power circuit 350 includes a voltage regulator module 356. The voltage regulator module 356 is connected to a processor in the system controller 302.

Although the mobile PC 2 is constituted as a body separate from the wearable device main body 4, the mobile PC 2 may be incorporated into the wearable device main body 4, and both of them may also be integrated into one body.

[Wearable Device 3]

An example of the external appearance of the wearable device 3 connected to the mobile PC 2 will be explained with reference to FIGS. 4 and 5. As described above, the wearable device 3 includes the eyeglass frame 142 and the wearable device main body 4.

The eyeglass frame 142 is provided with mounting brackets 144 on both the right and left temples thereof. The wearable device main body 24 is attached to and detached from one of the mounting brackets 144 on the right or left temple. In FIG. 4, the mounting bracket 144 on the temple on the right side of the operator is hidden behind the wearable device main body 4, and hence is not shown. As described above, the wearable device main body 4 is provided with a display 124. The display 124 is configured in such a way as to be viewed by one eye. Therefore, the mounting brackets 144 are provided on both the right and left temples so that the wearable device main body 4 can be attached to the mounting bracket on the dominant eye side.

The wearable device main body 4 needs not be detachably attached to the eyeglass frame 142 by means of the mounting bracket 144. The wearable device 3 for the right eye or left eye in which the wearable device main body 4 is fixed to the right side or the left side of the eyeglass frame 142 may be prepared.

Furthermore, the wearable device main body 4 may not be attached to the eyeglass frame 142, but may be attached to the head of the operator by using a helmet or goggle.

Figure 5:
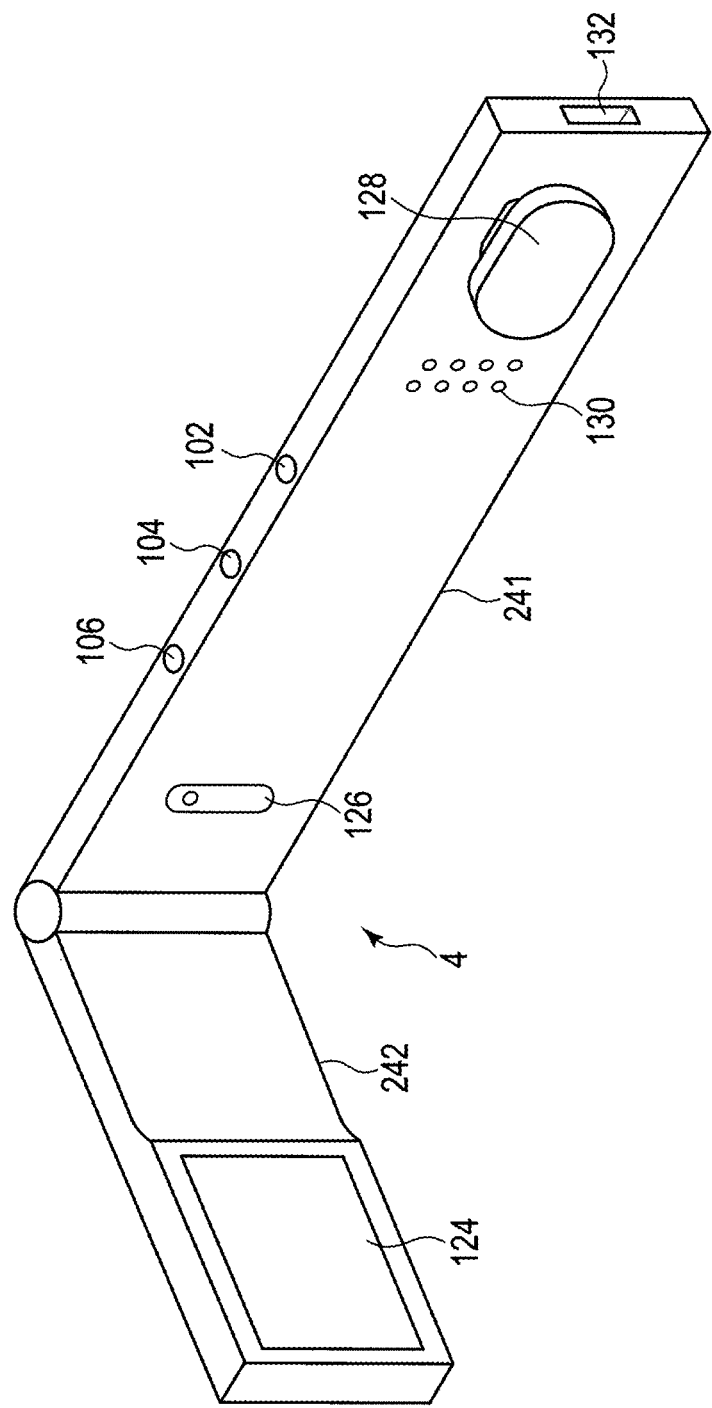
FIG. 5 is a perspective view illustrating an example of the external appearance of the main body of the wearable device of FIG. 1.

An engaging piece 128 shown in FIG. 5 of the wearable device main body 4 is forced between upper and lower frames of the mounting bracket 144, whereby the wearable device main body 4 is attached to the eyeglass frame 142. When the wearable device main body 4 is to be detached from the eyeglass frame 142, the engaging piece 128 is plucked out of the mounting bracket 144.

In a state where the wearable device main body 4 is attached to the mounting bracket 144, the engaging piece 128 is somewhat movable backward and forward in the mounting bracket 144. Accordingly, the wearable device main body 4 is adjustable in the front-back direction so that the operator's eye can be brought to a focus on the display 124.

Furthermore, the mounting bracket 144 is rotatable around an axis 144A perpendicular to the temple. After the wearable device main body 4 is attached to the eyeglass frame 142, the wearable device main body 4 is adjustable in the vertical direction so that the display 124 can be positioned on the operator's line of sight. Moreover, the rotational angle of the mounting bracket 144 is about 90 degrees and, by largely rotating the mounting bracket 144 in the upward direction, the wearable device main body 4 can be flipped up from the eyeglass frame 142. Thereby, even when it is difficult to watch the real thing because the field of view is obstructed by the wearable device main body 4 or even when the wearable device main body 4 interferes with surrounding objects in a small space, it is possible to temporarily divert/restore the wearable device main body 4 from/to the field of view of the operator without detaching/reattaching the entire wearable device 3 from/to the face of the operator.

[Wearable Device Main Body 4]

As described above, the wearable device main body 4 is constituted of the side part 241 to be along the temple of the eyeglass frame 142, and the front part 242 to be positioned on the line of sight of one eye of the operator. The angle which the front part 242 forms with the side part 241 is adjustable.

Figure 4:
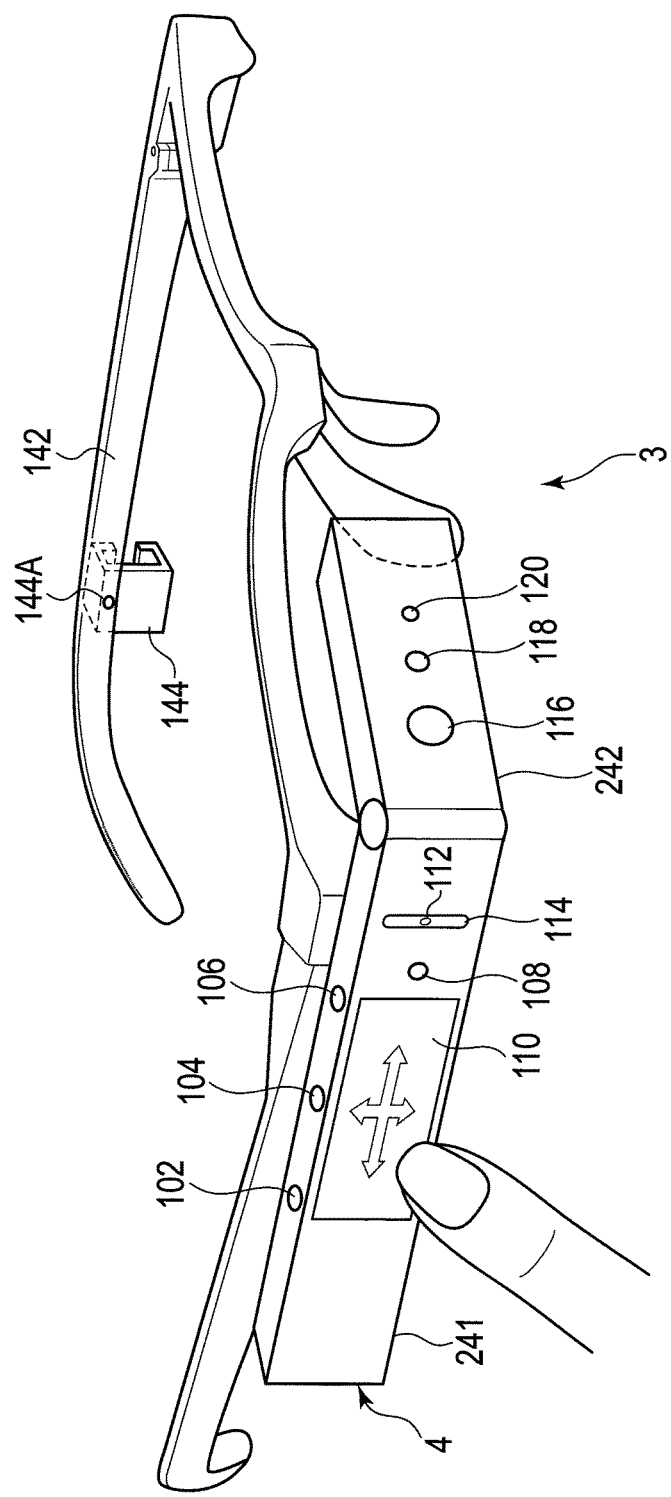
FIG. 4 is a perspective view illustrating an example of the external appearance of the wearable device of FIG. 1.

As shown in FIG. 4, on the outside surface of the front part 242, a camera 116, a light 118, and a camera LED 120 are provided. The light 118 is an auxiliary lighting fixture emitting light at the time of shooting a dark object. The camera LED 120 is configured to be turned on at the time of shooting a photograph or video to thereby cause the objective person to be photographed to recognize that he or she is to be photographed.

On the top surface of the side part 241 of the wearable device main body 4 attached to the right side temple, first, second, and third buttons 102, 104, and 106 are provided. When the dominant eye of the operator is the left eye, the wearable device main body 4 is attached to the left side temple. The top and the bottom of the wearable device main body 4 are reversed according to whether the wearable device main body 4 is attached to the right side temple or to the left side temple. Therefore, the first, second, and third buttons 102, 104, and 106 may be provided on both the top surface and undersurface of the side part 241.

On the outside surface of the side part 241, a touchpad 110, fourth button 108, microphone 112, and illuminance sensor 114 are provided. The touchpad 110 and fourth button 108 can be operated by using a forefinger. When the wearable device main body 4 is attached to the right side temple, the buttons 102, 104, and 106 are arranged at positions at which the buttons 102, 104, and 106 can be operated by a forefinger, middle finger, and third finger, respectively.

The touchpad 110 is configured such that the movement of a finger in up and down directions or back and forth directions on the surface on the touchpad 110 as indicated by arrows can be detected. The movement to be detected includes flicking of a finger for grazing the surface quickly with the finger in addition to dragging of a finger for moving the finger with the finger kept in contact with the surface. Upon detection of up-and-down or back-and-force movement of the operator's finger, the touchpad 110 inputs a command to execute a particular process.

Operation methods of the first to fourth buttons 102, 104, 106, and 108, and the touchpad 110 are determined in advance by programs.

For example,
when the third button 106 is pressed once, item selection/item execution is carried out (corresponding to pressing once of the decision button 202e in the mobile PC 2),
when the third button 106 is pressed for a long time, a list of application programs being executed is displayed (corresponding to pressing the up button 202a for a long time in the mobile PC 2),
when the second button 104 is pressed once, the screen returns to a home screen,
when the second button 104 is pressed for a long time, a menu of quick settings is displayed (corresponding to pressing the down button 202c for a long time in the mobile PC 2), and
when the first button 102 is pressed once, cancelation of operation (corresponding to pressing once of the decision button 202e in the mobile PC 2 or operation identical to the operation of the Esc key of keyboard) is executed.

With regard to the operation of the touchpad 110, for example,
when a vertical drag movement is detected, the cursor moves vertically,
when a frontward flick movement is detected, the left icon is selected (sequential scrolling) (corresponding to pressing once of the right button 202b in the mobile PC 2),
when a backward flick movement is detected, the right icon is selected (sequential scrolling) (corresponding to pressing once of the left button 202d in the mobile PC 2),
when a frontward drag movement is detected, the left icon is selected (scroll one item at a time) (corresponding to pressing once of the right button 202b in the mobile PC 2), and
when a backward drag movement is detected, the right icon is selected (scroll one item at a time) (corresponding to pressing once of the left button 202d in the mobile PC 2).

The first button 102, second button 104, third button 106, and fourth button 108 are arranged to be operated by a forefinger, a middle finger, a third finger, and a little finger, respectively. The reason why the fourth button 108 is provided not on the top surface of the side part 241, but on the outside surface of the side part 241 is that there is space restriction. The fourth button 108 may also be provided on the top surface of the side part 241 in the same manner as the first to third buttons 102, 104, and 106.

The operations performed with the buttons 102, 104, 106, and 108 and touchpad 110 of the wearable device main body 4 can be performed similarly with the cursor buttons 202 provided with the mobile PC 2. Since operators cannot view the operation of the buttons 102, 104, 106, and 108 and the touchpad 110 of the wearable device main body 4, some of the operators may require a time to get used to perform intentional operation. Furthermore, the buttons 102, 104, 106, and 108 and the touchpad 110 are small and may be difficult to operate. In the present embodiment, the same operations can be performed with the cursor buttons 202 of the mobile PC 2, and thus, the above problems can be solved.

The illuminance sensor 114 detects the illuminance of the surrounding area in order to automatically adjust the brightness of the display 124.

FIG. 5 shows an example of the external appearance of the back side of the wearable device main body 4. On the inner side of the front part 242, the display 124 that is realized as an LCD is provided. On the inner side of the side part 241, a microphone 126, a speaker 130, and the engaging piece 128 are provided. The microphone 126 is provided at the front position of the side part 241, and the speaker 130 and the engaging piece 128 are provided at the rear position of the side part 241. Headphones may be used in place of the speaker 130. In this case, the microphone and headphones may also be provided in an integrated manner as a headset.

FIG. 6 shows an example of the system configuration of the wearable device main body 4. The USB type-C receptacle 132 is connected to a mixer 166. The display controller 170 and the USB hub 164 are respectively connected to a first terminal and second terminal of the mixer 166. The display 124 is connected to the display controller 170. The camera controller 168, an audio codec 172, and the sensor controller 162 are connected to the USB hub 164. The camera 116, the flashlight 118, and the camera LED 120 are connected to the camera controller 168. Audio signals from the microphones 112 and 126 are input to the audio codec 172, and audio signal from the audio codec 172 is input to the speaker 130 through an amplifier 174.

A motion sensor (for example, acceleration, geomagnetism, gravitation, gyroscopic sensor, etc.) 176, the illuminance sensor 114, a proximity sensor 178, the touchpad 110, the first to fourth buttons 102, 104, 106, and 108, and a GPS sensor 180 are connected to the sensor controller 162. The sensor controller 162 processes signals generated by the motion sensor 176, the illuminance sensor 114, proximity sensor 178, the touchpad 110, the first to fourth buttons 102, 104, 106, and 108, and the GPS sensor 180, and supplies a command and data to the mobile PC 2. Although not shown in FIG. 5, the motion sensor 176 and the proximity sensor 178 are arranged inside the wearable device main body 4.

The motion sensor 176 detects movement, orientation, posture, and the like of the wearable device main body 4. The sensor controller 162 and the display controller 170 have an orientation auto-adjustment function to automatically adjust the orientation of the screen image displayed on the display 124 based on the movement, the orientation, the posture, and the like detected by the motion sensor 176.

The proximity sensor 178 detects attachment of the wearable device 3 based on an approach of a face, a finger and the like of the operator thereto.

The sensor controller 162 and the display controller 170 have a brightness auto-adjustment function to automatically adjust the brightness of the display 124 based on the illuminance detected by the illuminance sensor 114. Furthermore, the sensor controller 162 and the camera controller 168 have an LED auto-adjustment function to automatically switch on/off of the flashlight 118 based on the illuminance detected by the illuminance sensor 114.

An audio recognition device such as a smart speaker recognizes, for example, a special word (that is, a trigger word) that triggers a voice operation, and then recognizes one voice command (instruction). That is, the audio recognition device allows a user to speak one voice command after speaking a trigger word. However, there is a case where a user wants to speak multiple voice commands continuously after speaking a trigger word.

When a GUI of the host application program 308C is operated with voice, many operations may be performed to the GUI continuously. For example, in order that a cursor is moved on an object (for example, a button) of a GUI in a screen, a voice operation for moving the cursor horizontally or vertically by a certain amount may be repeatedly performed. In such a situation, speaking a trigger word each time before a voice command is spoken for an operation is troublesome to the user. A new function to recognize multiple voice commands for multiple operations performed continuously is thus required.

Therefore, the present embodiment utilizes a single-mode in which only one voice command can be recognized after recognizing a trigger word, and a multi-mode in which multiple voice commands can be recognized continuously after recognizing a trigger word. A user can switch the voice recognition mode in accordance with one or more operations to be performed, and thus, the voice operation becomes more convenient. Furthermore, since dictionary data for each mode is selectively used, voice commands recognizable from voice data can be limited to commands to be recognized in each mode, and thus, misrecognition and delay in the process can be reduced.

FIG. 7 shows an example of the functional configuration of the voice control program 308B executed on the mobile PC 2. The voice control program 308B uses dictionary data 581, 582, and 583 for voice recognition modes stored in a dictionary storage area 58 to recognize the contents spoken by a user from voice data. The dictionary storage area 58 is disposed in, for example, a nonvolatile memory such as a storage device 330.

The voice control program 308B operates in cooperation with one or more host application programs 308C. The voice control program 308B transmits information indicative of a result of voice recognition to a certain host application program 308C operating in cooperation. In the following description, a case where the host application program 308C operating in cooperation with the voice control program 308B has an image capture function using the camera 116 is exemplified.

The voice control program 308B includes a voice reception module 51, a voice recognition module 52, a mode control module 54, and a dictionary management module 55.

The voice reception module 51 receives voice data generated by collecting speech of a user from the wearable device 3 via a cable 146 or the like, for example. The audio codec 172 may generate the voice data by performing an analogue-digital (AD) conversion on voice signals that are collected using microphones 112 and 126, and the like of the wearable device 3. Furthermore, the voice reception module 51 may receive the voice data generated by collecting voice signals using a microphone (which is not shown) connected to the audio jack 208 of the mobile PC 2 and by performing the AD conversion on the collected voice signals with the audio codec 334. The voice data is constantly received while the user uses the mobile PC 2 and the wearable device 3, for example. The voice data may be a voice file.

The mode control module 54 controls the voice recognition mode of the voice control program 308B (the mobile PC 2). The mode control module 54 sets one of a trigger mode, a signal-mode and a multi-mode as the voice control recognition mode, based on a voice command recognized from the voice data.

In the trigger mode, a process to recognize one of one or more trigger commands (also referred to as trigger words) included in trigger mode dictionary data 581 associated with the trigger mode is performed. Each trigger command indicates, for example, a start of a voice operation. In the single-mode, a process to recognize one of voice commands included in single-mode dictionary data 582 associated with the single-mode is performed. In the multi-mode, a process to recognize one of voice commands included in multi-mode dictionary data 583 associated with the multi-mode may be repeatedly (continuously) performed.

Note that the voice control program 308B may further include a timer 53. The timer 53 detects a timeout of a voice recognition mode. A time from the instant when a certain mode is set as the voice recognition mode to the instant when a timeout should be detected is set to the timer 53. For example, the timer 53 may detect a timeout when a threshold time (for example, ten seconds) passes after the single-mode is set as the voice recognition mode. In response to the detection of the timeout, the voice recognition mode returns to an initial state. The voice recognition mode in the initial state is, for example, the trigger mode, or may be a mode different from the trigger mode.

FIG. 8 shows an example of controlling a transition of the voice recognition mode by the mode control module 54. In the initial state, the trigger mode M1 is set as the voice recognition mode, for example. The mode control module 54 switches the voice recognition mode in accordance with a type of a command recognized from voice data in the following manner.

(A1) The mode control module 54 switches from the trigger mode M1 currently set as the voice recognition mode to the single-mode M2 in response to recognition of a trigger command (that is, a voice command indicative of a start of a voice operation).

(A2) The mode control module 54 switches from the single-mode M2 currently set as the voice recognition mode to the multi-mode M3 in response to recognition of a voice command indicative of a start of a continuous voice operation.

(A3) The mode control module 54 switches from the single-mode M2 currently set as the voice recognition mode to the trigger mode M1 in response to recognition of a voice command which is different from the voice command indicative of the start of the continuous voice operation or in response to a timeout. The voice command which is different from the voice command indicative of the start of the continuous voice operation is a voice command to operate the host application program 308C (hereinafter, referred to as a host operation command).

(A4) The mode control module 54 switches from the multi-mode M3 currently set as the voice recognition mode to the trigger mode M1 in response to recognition of a voice command indicative of an end of the continuous voice operation.

(A5) The mode control module 54 keeps the multi-mode M3 currently set as the voice recognition mode while a voice command which is different from the voice command indicative of an end of the continuous voice operation is recognized. The voice command which is different from the voice command indicative of the end of the continuous voice operation is a voice command to operate the host application program 308C (that is, a host operation command).

Now, as shown in FIG. 7, the dictionary management module 55 reads dictionary data associated with the set voice recognition mode from the dictionary storage area 58 and supplies the read dictionary data to the voice recognition module 52. That is, when the trigger mode M1 is set as the voice recognition mode, the dictionary management module 55 reads the trigger mode dictionary data 581 from the dictionary storage area 58 and supplies the data 581 to the voice recognition module 52. When the single-mode M2 is set as the voice recognition mode, the dictionary management module 55 reads the single-mode dictionary data 582 from the dictionary storage area 58 and supplies the data 582 to the voice recognition module 52. When the multi-mode M3 is set as the voice recognition mode, the dictionary management module 55 reads the multi-mode dictionary data 583 from the dictionary storage area 58 and supplies the data 583 to the voice recognition module 52.

The trigger mode dictionary data 581 is dictionary data for voice recognition of one or more trigger commands that are used in the trigger mode M1. The single-mode dictionary data 582 is dictionary data for voice recognition of voice commands that are used in the single-mode M2. The multi-mode dictionary data 583 is dictionary data for voice recognition of voice commands that are used in the multi-mode M3.

The voice recognition module 52 performs a voice recognition process on voice data in the voice recognition mode set by the mode control module 54 using one of the dictionary data 581, 582 and 583 supplied by the dictionary management module 55. The voice recognition process includes acoustic analysis for the voice data, feature extraction, and matching to the dictionary data 581, 582, or 583. By performing the voice recognition process on the voice data, a command included in the voice data is obtained. The voice recognition module 52 may perform the voice recognition process in real time on the voice data constantly received by the voice reception module 51.

The voice recognition module 52 calculates features by analyzing the voice data, and when the calculated features include a feature corresponding to a command, determines that the command is recognized from the voice data, for example. Alternatively, the voice recognition module 52 uses phoneme dictionary data (not shown) including a feature of phoneme of each character to determine whether the feature in the phoneme dictionary data matches a feature of voice pattern in a certain period in the voice data, and determines a character (phoneme) corresponding to the voice pattern in the period. Characters corresponding to a voice pattern in each period in the voice data are determined in order, and when a character string composed of the determined characters matches a character string indicative of a certain command word, the voice recognition module 52 may determine that the command is recognized from the voice data.

When the trigger mode M1 is set as the voice recognition mode, the voice recognition module 52 performs a process to recognize one of one or more trigger commands indicated in the trigger mode dictionary data 581 from the voice data.

When the single-mode M2 is set as the voice recognition mode, the voice recognition module 52 performs a process to recognize one of voice commands indicated in the single-mode dictionary data 582 from the voice data. That is, while the single-mode M2 is set as the voice recognition mode, the voice recognition module 52 recognizes one voice command alone.

The single-mode dictionary data 582 indicates voice commands that include a voice command indicative of a start of a continuous voice operation and one or more host operation commands. The one or more host operation commands are different from the voice command indicative of the start of the continuous voice operation. When a voice command of the one or more host operation commands is recognized, the voice recognition module 52 sends information indicative of the recognized voice command to the host application program 308C. The host application program 308C operates in accordance with the information indicative of the voice command.

Furthermore, when the multi-mode M3 is set as the voice recognition mode, the voice recognition module 52 may repeatedly perform a process to recognize one of the voice commands indicated in the multi-mode dictionary data 583 from the voice data. That is, while the multi-mode M3 is set as the voice recognition mode, the voice recognition module 52 may recognize multiple voice commands. The multiple voice commands may include the same voice commands (for example, voice commands each indicative of "press shutter release button") or may include different voice commands.

The multi-mode dictionary data 583 indicates voice commands that include a voice command indicative of an end of the continuous voice operation and one or more host operation commands. The one or more host operation commands are different from the voice command indicative of the end of the continuous voice operation. When a voice command of the one or more host operation commands is recognized, the voice recognition module 52 sends information indicative of the recognized voice command to the host application program 308C. The host application program 308C operates in accordance with the information indicative of the voice command.

The configuration of each of the dictionary data 581, 582, and 583 will be explained with reference to FIGS. 9 to 11.

FIG. 9 shows a configuration example of the trigger mode dictionary data 581. The trigger mode dictionary data 581 includes one or more records corresponding to one or more trigger commands used in the trigger mode M1. Each record includes, for example, a trigger command ID field and a content field.

In a record corresponding to a trigger command, the trigger command ID field of the record indicates identification information of the trigger command. The content field of the record indicates a content to be spoken by a user for voice input of the trigger command.

The example of FIG. 9 shows a record 1-1 in which "trigger command 1" is set to the trigger command ID field and "start voice operation" is set to the content field. The trigger command 1 shown in the record 1-1 is used to start the single-mode M2 in which a process to recognize one of voice commands from voice data. Thus, a trigger command functions as a mode change command to change the voice recognition mode.

FIG. 10 shows a configuration example of the single-mode dictionary data 582. The single-mode dictionary data 582 includes records corresponding to voice commands used in the single-mode M2. Each record includes, for example, a command ID field and a content field.

In a record corresponding to a voice command, the command ID field of the record indicates identification information of the voice command. The content field of the record indicates a content to be spoken by a user to input the voice command.

The example of FIG. 10 shows four records including:
- a record 2-1 that includes "command 1" set to the command ID field and "press shutter release button" set to the content field;
- a record 2-2 that includes "command 2" set to the command ID field and "zoom in" set to the content field;
- a record 2-3 that includes "command 3" set to the command ID field and "zoom out" set to the content field; and
- a record 2-4 that includes "command 4" set to the command ID field and "start continuous voice operation" set to the content field.

The command 1 in the record 2-1 is used to command the host application program 308C to execute a process to generate a still image using the camera 116. The command 2 in the record 2-2 is used to command the host application program 308C to execute a process to make the camera 116 zoom in. The command 3 in the record 2-3 is used to command the host application program 308C to execute a process to make the camera 116 zoom out. The command 4 in the record 2-4 is used to start the multi-mode M3 in which a process to recognize one of the voice commands from voice data is performed repeatedly.

The commands 1, 2, and 3 in the records 2-1, 2-2, and 2-3 are host operation commands used for the operation of the host application program 308C. On the other hand, the command 4 in the record 2-4 is a mode change command used for changing of the voice recognition mode. Note that each record may further include a type field that indicates whether the corresponding command is either a host operation command or a mode change command. For example, the mode control module 54 may control the transition of the voice recognition mode in accordance with the type of the recognized voice command.

FIG. 11 shows a configuration example of the multi-mode dictionary data 583. The multi-mode dictionary data 583 includes records corresponding to voice commands used in the multi-mode M3. Each record includes, for example, a command ID field and a content field.

In a record corresponding to a voice command, the command ID field of the record indicates identification information of the voice command. The content field of the record indicates a content to be spoken by a user to input the voice command.

The example of FIG. 11 shows four records including:
- a record 3-1 that includes "command 1" set to the command ID field and "press shutter release button" set to the content field;
- a record 3-2 that includes "command 2" set to the command ID field and "zoom in" set to the content field;
- a record 3-3 that includes "command 3" set to the command ID field and "zoom out" set to the content field; and
- a record 3-4 that includes "command 5" set to the command ID field and "end continuous voice operation" set to the content field.

The commands 1, 2, and 3 in the records 3-1, 3-2, and 3-3 are the same as the commands 1, 2, and 3 in the records 2-1, 2-2, and 2-3 of the single-mode dictionary data 582 explained above with reference to FIG. 10. Thus, the commands 1, 2, and 3 in the records 3-1, 3-2, and 3-3 are host operation commands. The command 5 in the record 3-4 is a mode change command used to end the multi-mode M3 in which a process to recognize one of the voice commands from voice data is performed repeatedly. Note that each record may further include a type field that indicates whether the corresponding command is either a host operation command or a mode change command.

The trigger mode dictionary data 581 may be preliminarily defined, or may be created and/or updated (for example, changed, added, deleted, and the like). The trigger mode dictionary data 581 may be created or updated using a file (for example, a text file) received by the mobile PC 2 from an external device such as a server, or may be created or updated in accordance with an operation by a user using GUI of the host application program 308C or the like.

The dictionary storage area 58 may store a pair of the single-mode dictionary data 582 and the multi-mode dictionary data 583 that is associated with each of application programs executed on the mobile PC 2. In that case, the dictionary management module 55 detects an active application program that is currently operable by a user (that is, the host application program 308C). Then, when the single-mode M2 is set as the voice recognition mode, the dictionary management module 55 reads the single-mode dictionary data 582 associated with the active application program. In contrast, when the multi-mode M3 is set as the voice recognition mode, the dictionary management module 55 reads the multi-mode dictionary data 583 associated with the active application program.

The single-mode dictionary data 582 and the multi-mode dictionary data 583 may be preliminarily defined, or may be created and/or updated (for example, changed, added, deleted, or the like). The single-mode dictionary data 582 and the multi-mode dictionary data 583 may be created or updated using a file received by the mobile PC 2 from an external device such as a server, or may be created or updated in accordance with an operation by a user using GUI of the host application program 308C or the like.

With the configuration explained above, when a user speaks a trigger command, for example, the voice recognition mode is switched from the trigger mode M1 to the single-mode M2. When the user speaks any one of the voice commands in the single-mode dictionary data 582 while the single-mode M2 is set as the voice recognition mode, an operation corresponding to the voice command is performed by the host application program 308C and the voice recognition mode returns to the trigger mode M1 from the single-mode M2.

Alternatively, when a user speaks a trigger command and then speaks a voice command indicative of a start of a continuous voice operation, the voice recognition mode is switched from the trigger mode M1 to the single-mode M2, and is further switched from the single-mode M2 to the multi-mode M3. While the multi-mode M3 set as the voice recognition mode is kept, the user may repeatedly perform speaking any one of the voice commands indicated in the multi-mode dictionary data 583. At each time when any one of the voice commands is spoken, the host application program 308C performs an operation corresponding to the spoken voice command. When the user speaks a voice command indicative of an end of the continuous voice operation while the multi-mode M3 is set as the voice recognition mode, the voice recognition mode returns to the trigger mode M1.

As specific examples, scenarios 1 and 2 where a user operates the host application program 308C having a function to generate a still image using the camera 116 with voice will be explained.

(Scenario 1)

When the voice recognition has been started, a voice input is accepted in the trigger mode M1 set as the voice recognition mode. When a user speaks "start voice operation", the voice recognition mode transitions from the trigger mode M1 to the single-mode M2. Then, when the user speaks "zoom in", the host application program 308C executes a process to make the camera 116 zoom in, and the voice recognition mode returns to the trigger mode M1.

Then, when the user speaks "start voice operation" again, the voice recognition mode again transitions from the trigger mode M1 to the single-mode M2. Then, when the user speaks "press shutter release button", the host application program 308C executes a process to generate a still image with the camera 116, and the voice recognition mode returns to the trigger mode M1.

(Scenario 2)

When the voice recognition has been started, a voice input is accepted in the trigger mode M1 set as the voice recognition mode. When the user speaks "start voice operation", the voice recognition mode transitions from the trigger mode M1 to the single-mode M2. Then, when the user speaks "start continuous voice operation", the voice recognition mode transitions from the single-mode M2 to the multi-mode M3.

Then, when the user speaks "zoom in", the host application program 308C executes a process to make the camera 116 zoom in, and when the user further speaks "press shutter release button", the host application program 308C executes a process to generate a still image with the camera 116. Then, when the user speaks "end continuous voice operation", the voice recognition mode transitions from the multi-mode M3 to the trigger mode M1.

In a situation where a user continuously speaks multiple voice commands to operate the host application programs 308C, the voice recognition mode is switched to the multi-mode M3, and then the voice commands are spoken as in the scenario 2. Thus, the voice operation by the user can be simplified.

On the other hand, in a situation where a user speaks only one voice command to operate the host application program 308C, the voice recognition mode is switched to the single-mode M2, the one voice command is spoken, and then the voice recognition mode returns to the trigger mode M1 as in the scenario 1. Since only the process to accept one trigger command is performed in the trigger mode M1, the returning from the single-mode M2 to the trigger mode M1 may reduce the process amount as compared to a case where the multi-mode M3 is kept as the voice recognition mode to accept multiple voice commands to operate the host application program 308C.

As can be understood from the above, in the voice recognition modes M1, M2, and M3, the data of dictionaries 581, 582, and 583 are used, respectively. Each of the data of dictionaries 581, 582, and 583 includes only commands to be recognized in the associated voice recognition mode. Thus, a time required for the voice recognition process can be shortened, and the results of recognition can be more accurate as compared to a case where data of a single dictionary including all the commands to be recognized in the voice recognition modes M1, M2, and M3 is used. Furthermore, with the multi-mode M3, the user does not need to speak a trigger word each time before speaking one voice command to operate the host application program 308C. By choosing one of the single-mode M2 and the multi-mode M3 in accordance with an operation to be performed by the user, the user can perform the operation conveniently.

With reference to flowcharts of FIGS. 12 to 15, an example of the procedure of a voice control process executed by the mobile PC 2 will be explained.

As shown in FIG. 12, the mobile PC 2 initially sets the trigger mode M1 as the voice recognition mode and sets the trigger mode dictionary data 581 as the dictionary to be used (step S101). Then, the mobile PC 2 executes a trigger mode recognition process which is a voice recognition process in the trigger mode M1 (step S102). In the trigger mode recognition process, for example, one of one or more trigger commands registered in the trigger mode dictionary data 581 is recognized from voice data that is input to the mobile PC 2 from the wearable device 3. The trigger mode recognition process ends in response to the recognition of one trigger command. The procedure of the trigger mode recognition process will be explained later with reference to FIG. 13.

When the trigger mode recognition process of step S102 ends, that is, when one trigger command is recognized, the mobile PC 2 sets the single-mode M2 as the voice recognition mode and sets the single-mode dictionary data 582 as the dictionary to be used (step S103). Then, the mobile PC 2 executes a single-mode recognition process which is a voice recognition process in the single-mode M2 (step S104). In the single-mode recognition process, for example, one of the voice commands registered in the single-mode dictionary data 582 is recognized from voice data that is input to the mobile PC 2 from the wearable device 3. The single-mode recognition process ends in response to the recognition of one voice command in the single-mode M2. The procedure of the single-mode recognition process will be explained later with reference to FIG. 14.

When the single-mode recognition process of step S104 ends, the mobile PC 2 determines whether a voice command indicative of a start of a continuous voice operation is recognized in the single-mode recognition process (step S105). When a voice command indicative of a start of a continuous voice operation is not recognized (NO in step S105), the mobile PC 2 determines whether a timeout is detected in the single-mode recognition process (step S106).

When a timeout is not detected (NO in step S106), the mobile PC 2 sends information indicative of the voice command recognized in the single-mode recognition process to the host application program 308C (step S107). On the other hand, when a timeout is detected (YES in step S106), the process returns to step S101, and the voice recognition process in the trigger mode M1 is started again.

Furthermore, when a voice command indicative of a start of a continuous voice operation is recognized (YES in step S105), the mobile PC 2 sets the multi-mode M3 as the voice recognition mode and sets the multi-mode dictionary data 583 as the dictionary to be used (step S108). Then, the mobile PC 2 executes a multi-mode recognition process which is a voice recognition process in the multi-mode M3 (step S109). In the multi-mode recognition process, one of the voice commands registered in the multi-mode dictionary data 583 is recognized from voice data that is input to the mobile PC 2 from the wearable device 3, for example. The multi-mode recognition process ends in response to the recognition of one voice command in the multi-mode M3. The procedure of the multi-mode recognition process will be explained later with reference to FIG. 15.

When the multi-mode recognition process of step S109 ends, that is, when one voice command in the multi-mode M3 has been recognized, the mobile PC 2 determines whether a voice command indicative of an end of a continuous voice operation is recognized in the multi-mode recognition process (step S110). When a voice command indicative of an end of a continuous voice operation is recognized (YES in step S110), the process returns to step S101, and the voice recognition process in the trigger mode M1 is started again.

When a voice command indicative of an end of a continuous voice operation is not recognized (NO in step S110), the mobile PC 2 sends information indicative of the voice command recognized in the multi-mode recognition process to the host application program 308C (step S111), and the process returns to step S109. Thus, the multi-mode recognition process is repeated until a voice command indicative of an end of a continuous voice operation is recognized.

As described above, when a trigger command is recognized from voice data in the trigger mode M1, one voice command is recognized in the single-mode M2. When the recognized voice command is a voice command for operation of the host application program 308C, information indicative of the voice command is sent to the host application program 308C. On the other hand, when the recognized voice command is a voice command for starting the multi-mode M3, the multi-mode M3 in which a process to recognize one of voice commands from voice data may be continuously performed is started. In each voice recognition mode, a dictionary including only the commands to be recognized in the corresponding voice recognition mode is used. Thus, a time required to the voice recognition process can be shortened, and the result of recognition can be more accurate as compared to a case where a single dictionary including all the commands to be recognized in the modes M1, M2 and M3 is used.

Figure 13:
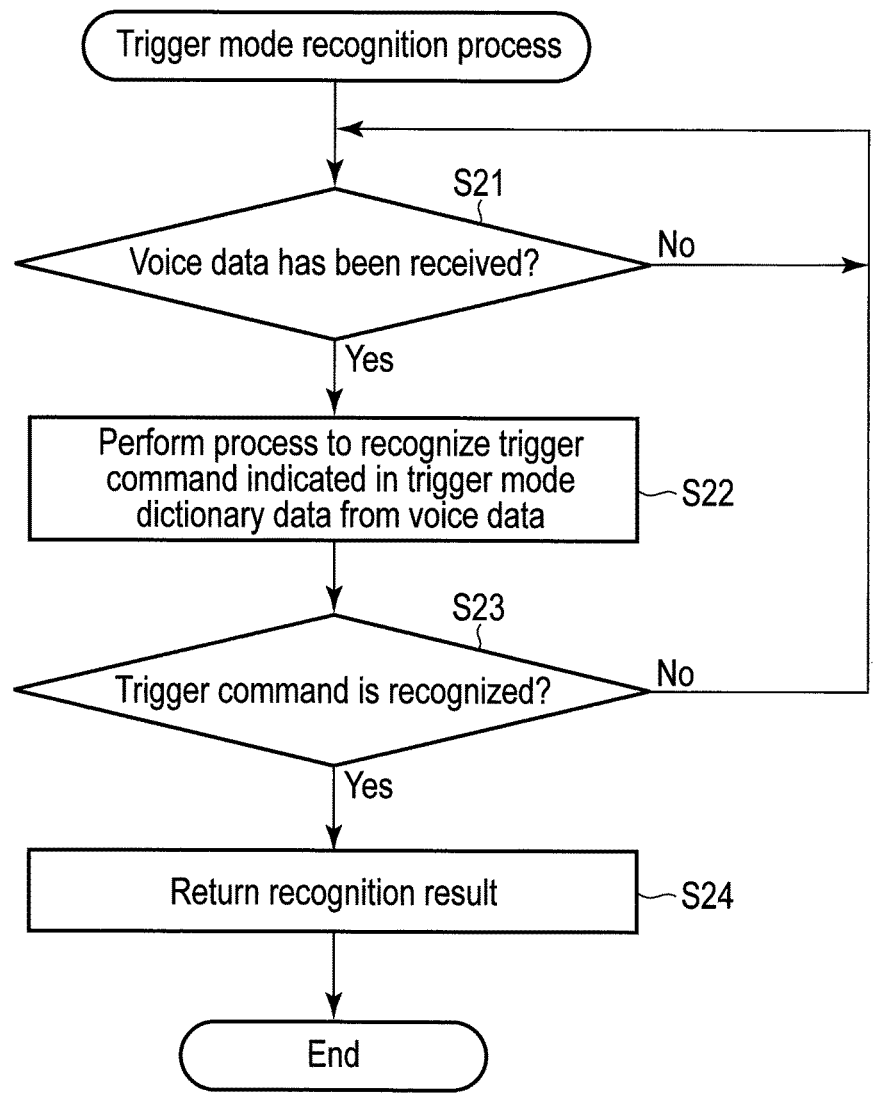
FIG. 13 is a flowchart of an example of the procedure of a trigger mode recognition process executed by the electronic device of the first embodiment.

FIG. 13 shows a flowchart of an example of the procedure of a trigger mode recognition process executed by the mobile PC 2. The trigger mode recognition process corresponds to step S102 of the voice control process mentioned above with reference to FIG. 12.

Firstly, the mobile PC 2 determines whether voice data has been received (step S21). The mobile PC 2 receives voice data transmitted from the wearable device 3 via the cable 146 or the like, for example. When voice data has not been received (NO in step S21), the process returns to step S21, and whether voice data has been received is determined again.

When voice data has been received (YES in step S21), the mobile PC 2 performs a process to recognize a trigger command indicated in the trigger mode dictionary data 581 from the received voice data (step S22). In this process, for example, features are calculated from the voice data, and when the features include a feature corresponding to a trigger command in the trigger mode dictionary data 581, the mobile PC 2 determines that the trigger command is recognized from the voice data.

The mobile PC 2 determines whether a trigger command is recognized from the voice data (step S23). When a trigger command is not recognized from the voice data (NO in step S23), the process returns to step S21, and a process to recognize a trigger command from newly received voice data is continued.

On the other hand, when a trigger command is recognized from the voice data (YES in step S23), the mobile PC 2 returns a recognition result indicative of the recognized trigger command (step S24), and the process ends. The recognition result may be used in the voice control process of FIG. 12. Note that, in the voice control process, if information indicative of which one of the trigger commands that are indicated in the trigger mode dictionary data 581 is recognized is not necessary, step S24 may be omitted.

Through the above process, a trigger command can be recognized from voice data.

FIG. 14 shows a flowchart of an example of the procedure of a single-mode recognition process executed by the mobile PC 2. The single-mode recognition process corresponds to step S104 of the voice control process mentioned above with reference to FIG. 12.

Firstly, the mobile PC 2 starts a timer 53 (step S31). A time to detect a timeout of the single-mode M2 is set to the timer 53.

Then, the mobile PC 2 determines whether voice data has been received (step S32). When voice data has been received (YES in step S32), the mobile PC 2 performs a process to recognize a voice command indicated in the single-mode dictionary data 582 from the received voice data (step S33). In this process, for example, features are calculated from the voice data, and when the features include a feature corresponding to a voice command in the single-mode dictionary data 582, the mobile PC 2 determines that the voice command is recognized from the voice data.

The mobile PC 2 determines whether a voice command is recognized from the voice data (step S34). When a voice command is recognized from the voice data (YES in step S34), the mobile PC 2 returns a recognition result indicative of the recognized voice command (step S35), and the process ends. The recognition result indicates one of voice commands included in the single-mode dictionary data 582 and is used in the voice control process of FIG. 12.

On the other hand, when a voice command is not recognized from the voice data (NO in step S34), or when voice data has not been received (NO in step S32), the mobile PC 2 determines whether a timeout is detected with the timer 53 (step S36). When a timeout is not detected (NO in step S36), the process returns to step S32, and a process to recognize a voice command from newly acquired voice data is continued.

When a timeout is detected (YES in step S36), the mobile PC 2 returns information indicative of the timeout (step S37), and the process ends. The information indicative of the timeout is used in the voice control process of FIG. 12.

Through the above process, a voice command in the single-mode M2 can be recognized from voice data or a timeout in the single-mode M2 can be detected.

Figure 15:
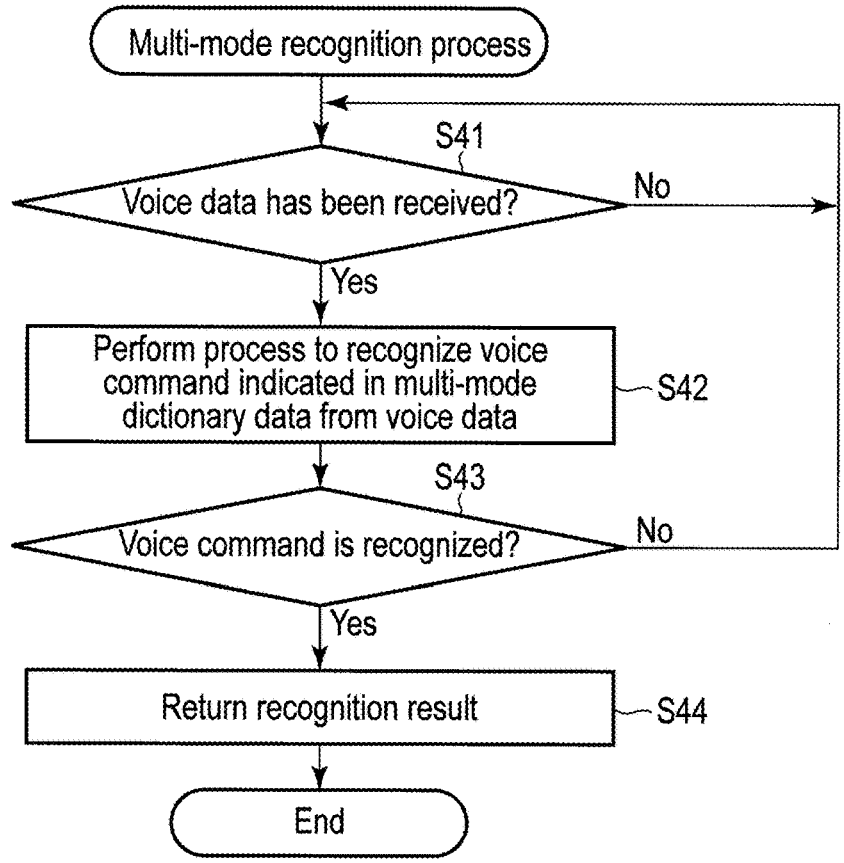
FIG. 15 is a flowchart of an example of the procedure of a multi-mode recognition process executed by the electronic device of the first embodiment.

FIG. 15 shows a flowchart of an example of the procedure of a multi-mode recognition process executed by the mobile PC 2. The multi-mode recognition process corresponds to step S109 of the voice control process explained above with reference to FIG. 12.

Firstly, the mobile PC 2 determines whether voice data has been received (step S41). When voice data has not been received (NO in step S41), the process returns to step S41, and whether voice data has been received is determined again.

When voice data has been received (YES in step S41), the mobile PC 2 performs a process to recognize a voice command indicated in the multi-mode dictionary data 583 from the received voice data (step S42). In this process, for example, features are calculated from the voice data, and when the features include a feature corresponding to a voice command in the multi-mode dictionary data 583, the mobile PC 2 determines that the voice command is recognized from the voice data.

The mobile PC 2 determines whether a voice command is recognized from the voice data (step S43). When a voice command is not recognized from the voice data (NO in step S43), the process returns to step S41, and a process to recognize a voice command from newly received voice data is continued.

On the other hand, when a voice command is recognized from the voice data (YES in step S43), the mobile PC 2 returns a recognition result indicative of the recognized voice command (step S44), and the process ends. The recognition result indicates one of voice commands included in the multi-mode dictionary data 583 and is used in the voice control process of FIG. 12.

Through the above process, a voice command in the multi-mode M3 can be recognized from voice data.

Figure 16:
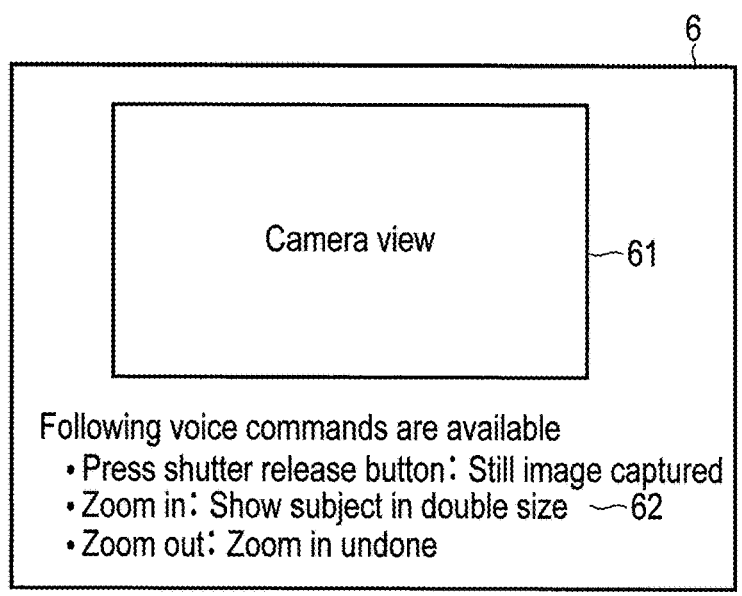
FIG. 16 illustrates an example of a screen image displayed on a display of the wearable device of FIG. 1.

FIG. 16 shows an example of a screen image 6 of the host application program 308C displayed on the display 124 of the wearable device 3. In this example, the host application program 308C has an image capture function using the camera 16.

The screen image 6 includes a camera view area 61 and a command list area 62. An image captured by the camera 116 is displayed in real time in the camera view area 61. One or more voice commands available for the host application program 308C are shown in the command list area 62. In the command list area 62, words (or sentences) to be spoken as the voice commands and behaviors of the host application program 308C corresponding to the voice commands are shown.

A user can input one of the voice commands shown in the command list area 62 to the mobile PC 2 (the voice control program 308B) by speaking a trigger command and then speaking the one of the voice commands with the microphones 112 and 126 of the wearable device 3 and the like. Alternatively, a user can input one or more of the voice commands shown in the command list area 62 to the mobile PC 2 by speaking a trigger command and then speaking "start continuous voice operation", and further speaking the one or more of the voice commands continuously.

Note that, in the screen image 6, a trigger command, a content of a voice command to start a continuous voice operation (e.g., words to be spoken), a content of a voice command to end a continuous voice operation, and the like may further be displayed.

Second Embodiment

In the first embodiment, the voice recognition mode transitions from the trigger mode M1 to the single-mode M2 when a trigger command is recognized. In contrast, in the second embodiment, the voice recognition mode transitions from the trigger mode M1 to the single-mode M2 or the multi-mode M3 when a trigger command is recognized.

The configuration of the mobile PC 2 and the wearable device 3 of the second embodiment are the same as the mobile PC 2 and the wearable device 3 of the first embodiment, and the procedures of processes executed by the mode control module 54 and the voice recognition module 52 are different between the first and second embodiments. In the following description, only the points different from the first embodiment are explained.

The mode control module 54 sets the trigger mode M1 as an initial state of the voice recognition mode. The mode control module 54 switches the voice recognition mode from the trigger mode M1 to the single-mode M2 or the multi-mode M3 in accordance with a trigger command recognized from voice data.

Figure 17:
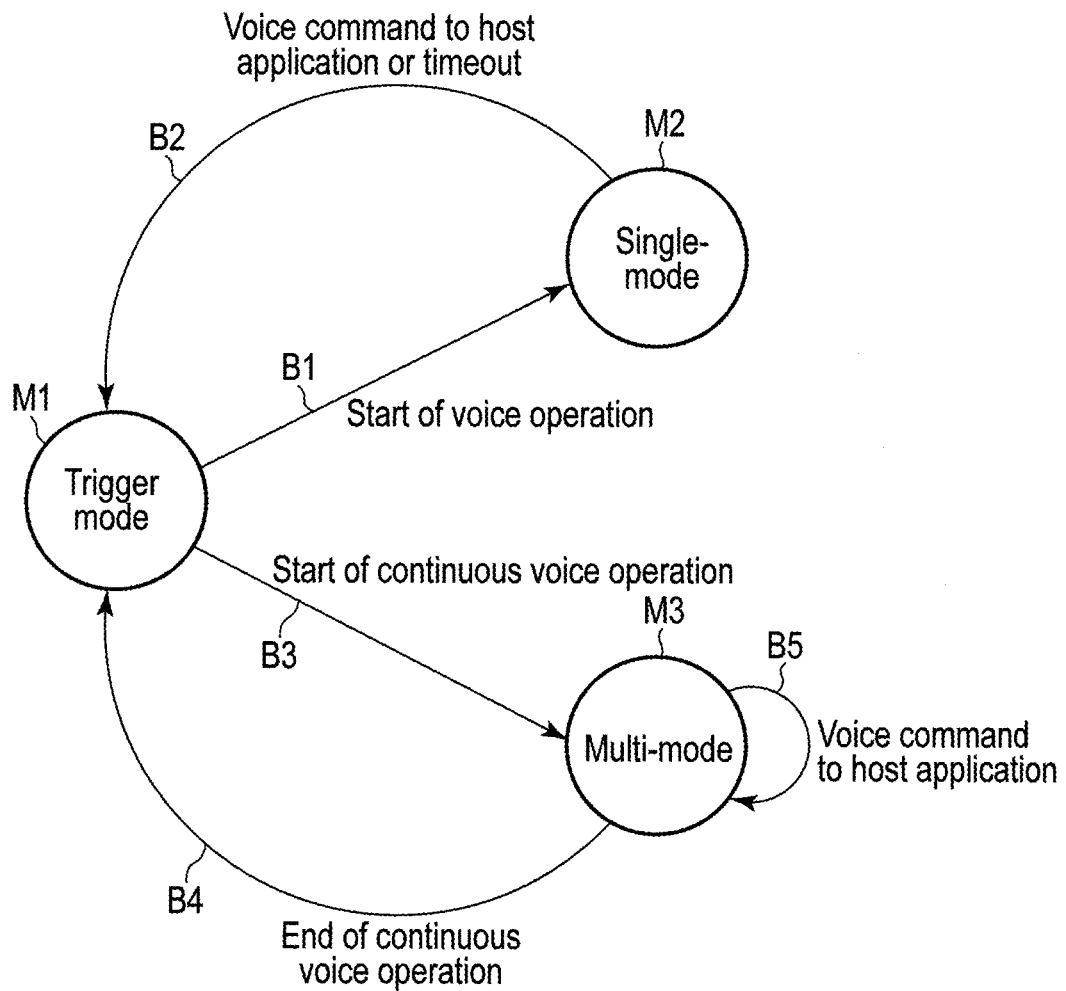
FIG. 17 illustrates an example of transition of a voice recognition mode in an electronic device according to a second embodiment.

FIG. 17 shows an example of controlling a transition of the voice recognition mode by the mode control module 54. In the initial state, the trigger mode M1 is set as the voice recognition mode, for example. The mode control module 54 switches the voice recognition mode in accordance with a type of a command recognized from voice data in the following manner.

(B1) The mode control module 54 switches from the trigger mode M1 currently set as the voice recognition mode to the single-mode M2 in response to recognition of a trigger command indicative of a start of a voice operation.

(B2) The mode control module 54 switches from the single-mode M2 currently set as the voice recognition mode to the trigger mode M1 in response to recognition of a voice command to operate the host application program 508C (that is, a host operation command), or in response to a timeout.

(B3) The mode control module 54 switches from the trigger mode M1 currently set as the voice recognition mode to the multi-mode M3 in response to recognition of a trigger command indicative of a start of a continuous voice operation.

(B4) The mode control module 54 switches from the multi-mode M3 currently set as the voice recognition mode to the trigger mode M1 in response to recognition of a voice command indicative of an end of the continuous voice operation.

(B5) The mode control module 54 keeps the multi-mode M3 currently set as the voice recognition mode while a voice command that is different from a voice command indicative of an end of the continuous voice operation is recognized. The voice command that is different from a voice command indicative of an end of the continuous voice operation is a voice command to operate the host application program 308C (that is, host operation command).

Configuration examples of the trigger mode dictionary data 581, the single-mode dictionary data 582, and the multi-mode dictionary data 583 used in the mobile PC 2 of the second embodiment will be explained with reference to FIGS. 18 to 20.

FIG. 18 shows a configuration example of the trigger mode dictionary data 581. The example of FIG. 18 shows two records including:

a record 5-1 that includes "trigger command 1" set to the trigger command ID field and "start voice operation" set to the content field; and a record 5-2 that includes "trigger command 2" set to the trigger command ID field and "start continuous voice operation" set to the content field.

The trigger command 1 indicated in the record 5-1 is used to start the single-mode M2 in which a process to recognize one of voice commands from voice data is performed. Furthermore, the trigger command 2 indicated in the record 5-2 is used to start the multi-mode M3 in which a process to recognize one of the voice commands from voice data is performed repeatedly. Thus, the trigger commands 1 and 2 function as mode change commands to change the voice recognition mode.

FIG. 19 shows a configuration example of the single-mode dictionary data 582. The example of FIG. 19 shows three records including:

a record 6-1 that includes "command 1" set to the command ID field and "press shutter release button" set to the content field;

a record 6-2 that includes "command 2" set to the command ID field and "zoom in" set to the content field; and a record 6-3 that includes "command 3" set to the command ID field and "zoom out" set to the content field.

The command 1 indicated in the record 6-1 is used to command the host application program 308C to execute a process to generate a still image with the camera 116. The command 2 indicated in the record 6-2 is used to command the host application program 308C to execute a process to make the camera 116 zoom in. The command 3 indicated in the record 6-3 is used to command the host application program 308C to execute a process to make the camera 116 zoom out. The commands 1, 2, and 3 indicated in the records 6-1, 6-2, and 6-3 are host operation commands used for the operation of the host application program 308C.

The single-mode dictionary data 582 does not include any mode change command. Thus, the voice recognition module 52 sends, when one of the voice commands indicated in the single-mode dictionary data 582 is recognized, information indicative of the recognized voice command to the host application program 308C.

FIG. 20 shows a configuration example of the multi-mode dictionary data 583. The example of FIG. 20 shows four records including:

a record 7-1 that includes "command 1" set to the command ID field and "press shutter release button" set to the content field;

a record 7-2 that includes "command 2" set to the command ID field and "zoom in" set to the content field;

a record 7-3 that includes "command 3" set to the command ID field and "zoom out" set to the content field; and a record 7-4 that includes "command 4" set to the command ID field and "end continuous voice operation" set to the content field.

The commands 1, 2, and 3 indicated in the records 7-1, 7-2, and 7-3 are the same as the commands 1, 2, and 3 indicated in the records 6-1, 6-2, and 6-3 of the single-mode dictionary data 582 explained above with reference to FIG. 19, respectively. Thus, the commands 1, 2, and 3 indicated in the records 7-1, 7-2, and 7-3 are host operation commands. The command 4 indicated in the record 7-4 is a mode change command used to end the multi-mode M3 in which a process to recognize one of the voice commands from voice data is performed repeatedly. Note that each record may further include a type field that indicates whether the corresponding command is either a host operation command or a mode change command.

With the configuration explained above, when a user speaks "start voice operation" which is a trigger command, the voice recognition mode is switched from the trigger mode M1 to the single-mode M2. When the user speaks any one of the voice commands indicated in the single-mode dictionary data 582 while the single-mode M2 is set as the voice recognition mode, the host application program 308C performs an operation corresponding to the voice command, and the voice recognition mode returns to the trigger mode M1 from the single-mode M2.

Furthermore, when a user speaks "start continuous voice operation" which is another trigger command, the voice recognition mode is switched from the trigger mode M1 to the multi-mode M3. While the multi-mode M3 is kept as the voice recognition mode, the user can repeatedly perform speaking a voice command indicated in the multi-mode dictionary data 583. At each time when any one of the voice commands is spoken, the host application program 308C performs an operation corresponding to the voice command. When the user speaks a voice command indicative of an end of the continuous voice operation while the multi-mode M3 is set as the voice recognition mode, the voice recognition mode returns to the trigger mode M1.

As specific examples, scenarios 3 and 4 where a user operates the host application program 308C having a function to generate a still image using the camera 116 with voice will be explained.

(Scenario 3)

When the voice recognition has been started, a voice input is accepted in the trigger mode M1 set as the voice recognition mode. When a user speaks "start voice operation", the voice recognition mode transitions from the trigger mode M1 to the single-mode M2. Then, when the user speaks "zoom in", the host application program 308C executes a process to make the camera 116 zoom in, and the voice recognition mode returns to the trigger mode M1.

Then, when the user speaks "start voice operation" again, the voice recognition mode again transitions from the trigger mode M1 to the single-mode M2. Then, when the user speaks "press shutter release button", the host application program 308C executes a process to generate a still image using the camera 116, and the voice recognition mode returns to the trigger mode M1.

(Scenario 4)

When the voice recognition has been started, a voice input is accepted in the trigger mode M1 set as the voice recognition mode. When the user speaks "start continuous voice operation", the voice recognition mode transitions from the trigger mode M1 to the multi-mode M3.

Then, when the user speaks "zoom in", the host application program 308C executes a process to make the camera 116 zoom in. When the user further speaks "press shutter release button", the host application program 308C executes a process to generate a still image using the camera 116. Then, when the user speaks "end continuous voice operation", the voice recognition mode transitions from the multi-mode M3 to the trigger mode M1.

In a situation where a user continuously speaks multiple voice commands to operate the host application programs 308C, the voice recognition mode is switched to the multi-mode M3, and then the voice commands are spoken as in the scenario 4. Thus, the voice operation by the user can be simplified.

On the other hand, in a situation where a user speaks only one voice command to operate the host application program 308C, the voice recognition mode is switched to the single-mode M2, the one voice command is spoken, and then the voice recognition mode returns to the trigger mode M1 as in the scenario 3. Since only the process to accept two trigger commands (single-mode or multi-mode) is performed in the trigger mode M1, the returning to the trigger mode M1 from the single-mode M2 may reduce the process amount as compared to a case where the multi-mode M3 is kept as the voice recognition mode to accept multiple voice commands to operate the host application program 308C.

As can be understood from the above, in the voice recognition modes M1, M2, and M3, the data of dictionaries 581, 582, and 583 are used, respectively. Each of the data of dictionaries 581, 582, and 583 includes only commands to be recognized in the associated voice recognition mode. Thus, a time required for the voice recognition process can be shortened, and the results of recognition can be more accurate as compared to a case where data of a single dictionary including all the commands to be recognized in the voice recognition modes M1, M2, and M3 is used.

Figure 21:
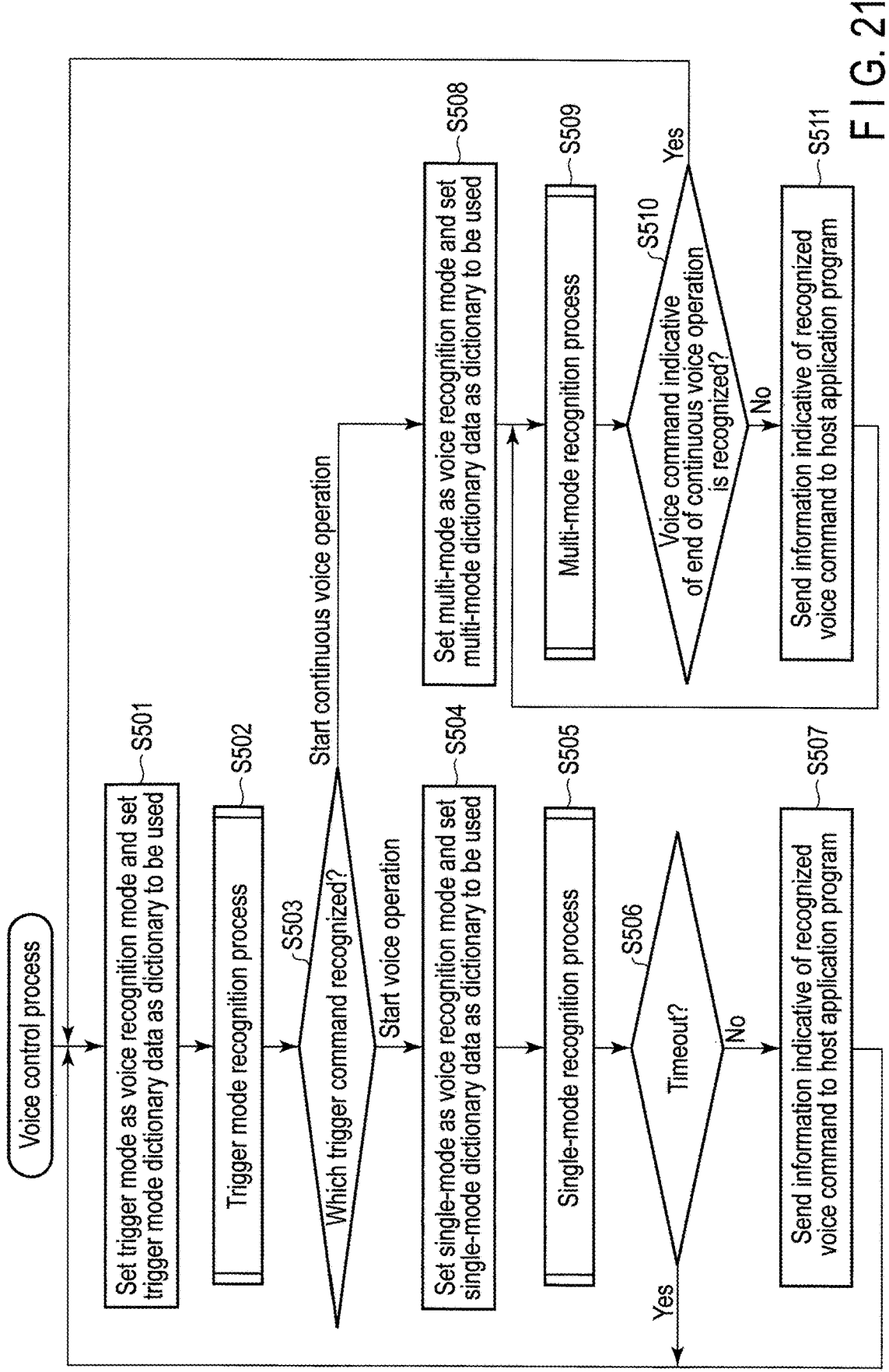
FIG. 21 is a flowchart of an example of the procedure of a voice control process executed by the electronic device of the second embodiment.

With reference to a flowchart of FIG. 21, an example of the procedure of a voice control process executed by the mobile PC 2 will be explained.

Firstly, the mobile PC 2 sets the trigger mode M1 as the voice recognition mode and sets the trigger mode dictionary data 581 as the dictionary to be used (step S501). Then, the mobile PC 2 executes a trigger mode recognition process which is a voice recognition process in the trigger mode M1 (step S502). In the trigger mode recognition process, for example, one of one or more trigger commands registered in the trigger mode dictionary data 581 is recognized from voice data that is input to the mobile PC 2 from the wearable device 3. The trigger mode recognition process ends in response to the recognition of one trigger command. The procedure of the trigger mode recognition process is as explained above with reference to the flowchart of FIG. 13.

When the trigger mode recognition process of step S502 ends, that is, when one trigger command is recognized, the mobile PC 2 branches the process in accordance with the recognized trigger command (step S503). When the recognized trigger command is a trigger command indicative of a start of a voice operation (start voice operation in step S503), the mobile PC 2 sets the single-mode M2 as the voice recognition mode, and sets the single-mode dictionary data 582 as the dictionary to be used (step S504). Then, the mobile PC 2 executes a single-mode recognition process which is a voice recognition process in the single-mode M2 (step S505). In the single-mode recognition process, for example, one of the voice commands registered in the single-mode dictionary data 582 is recognized from voice data that is input to the mobile PC 2 from the wearable device 3. The procedure of the single-mode recognition process is as explained above with reference to the flowchart of FIG. 14.

When the single-mode recognition process of step S505 ends, the mobile PC 2 determines whether a timeout is detected in the single-mode recognition process (step S506). When a timeout is not detected (NO in step S506), the mobile PC 2 sends information indicative of a voice command recognized in the single-mode recognition process to the host application program 308C (step S507). On the other hand, when a timeout is detected (YES in step S506), the process returns to step S501 and the voice recognition process in the trigger mode M1 is started again.

Furthermore, when the recognized trigger command is a voice command indicative of a start of a continuous voice operation (start continuous voice operation in step S503), the mobile PC 2 sets the multi-mode M3 as the voice recognition mode and sets the multi-mode dictionary data 583 as the dictionary to be used (step S508). Then, the mobile PC 2 executes a multi-mode recognition process which is a voice recognition process in the multi-mode M3 (step S509). In the multi-mode recognition process, one of voice commands registered in the multi-mode dictionary data 583 is recognized from voice data that is input to the mobile PC 2 from the wearable device 3, for example. The multi-mode recognition process ends in response to the recognition of one voice command in the multi-mode M3. The procedure of the multi-mode recognition process is as explained above with reference to the flowchart of FIG. 15.

When the multi-mode recognition process of step S509 ends, that is, when one voice command in the multi-mode M3 has been recognized, the mobile PC 2 determines whether a voice command indicative of an end of the continuous voice operation is recognized in the multi-mode recognition process (step S510). When a voice command indicative of an end of the continuous voice operation is recognized (YES in step S510), the process returns to step S501, and the voice recognition process in the trigger mode M1 is started again.

When a voice command indicative of an end of the continuous voice operation is not recognized (NO in step S510), the mobile PC 2 sends information indicative of the voice command recognized in the multi-mode recognition process to the host application program 308C (step S511), and the process returns to step S509. Thus, the multi-mode recognition process is repeated until a voice command indicative of an end of the continuous voice operation is recognized.

As described above, when a trigger command indicative of a start of a voice operation is recognized from voice data in the trigger mode M1, one voice command is recognized in the single-mode M2. Then, information indicative of the recognized voice command is transmitted to the host application program 308C. Furthermore, when a trigger command indicative of a start of a continuous voice operation is recognized from voice data in the trigger mode M1, the multi-mode M3 in which a process to recognize one of voice commands from voice data may be continuously performed is started. In the voice recognition modes M1, M2, and M3, the data of dictionaries 581, 582, and 583 are used, respectively. Each of the data of dictionaries 581, 582, and 583 includes only commands to be recognized in the associated voice recognition mode. Thus, a time required to the voice recognition process can be shortened, and the result of recognition can be more accurate as compared to a case where data of a single dictionary including all the commands to be recognized in the voice recognition modes M1, M2, and M3 is used.

As explained above, in the first and second embodiments, a voice command operation can be performed more conveniently. A transceiver such as the USB Type-C receptacle 207 (and/or the USB controller 322) and the Bluetooth/wireless LAN device 340 establishes a wired connection or a wireless connection between the mobile PC 2 and the wearable device 3 wearable by a user. The voice reception module 51 receives voice data generated by collecting speech of the user from the wearable device 3. The voice recognition module 52 executes a process to recognize one of one or more first commands (trigger commands) from the voice data when the trigger mode M1 is set as the voice recognition mode. The voice recognition module 52 executes a process to recognize one of second commands from the voice data when the single-mode M2 is set as the voice recognition mode. The voice recognition module 52 repeatedly executes a process to recognize one of third commands from the voice data when the multi-mode M3 is set as the voice recognition mode.

In each of the modes M1, M2, and M3, a process to recognize a command available in the mode from voice data is performed, and a process to recognize a command available in other voice modes is not performed. Thus, the voice recognition process can be performed rapidly and the results of recognition can be more accurate. Furthermore, while the multi-mode M3 is set as the voice recognition mode, the user can speak multiple voice commands continuously to operate the host application program 308C. Thus, the user can choose the single-mode M2 or the multi-mode M3 in accordance with one or more operations to be performed, and can perform the operations conveniently.

Each of various functions described in the first and second embodiments may be realized by a circuit (e.g., processing circuit). An exemplary processing circuit may be a programmed processor such as a central processing unit (CPU). The processor executes computer programs (instructions) stored in a memory thereby perform the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the first and second embodiments may be realized in a processing circuit.

Furthermore, various processes of the first and second embodiments can be realized by executing a computer programs. Thus, the same advantages obtained by the first and second embodiments can be achieved by installing the computer program into a computer via a computer readable storage medium storing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a transceiver that establishes a wired connection or a wireless connection between the electronic device and a wearable device wearable by a user; and
a hardware processor that
receives voice data generated by collecting speech of the user from the wearable device,
performs a process to recognize one of one or more first commands from the voice data when a first mode is set as a voice recognition mode,
performs a process to recognize one of second commands from the voice data when a second mode is set as the voice recognition mode, and
repeatedly performs a process to recognize one of third commands from the voice data when a third mode is set as the voice recognition mode,
wherein the processor
sends, when one of one or more sixth commands included in the second commands is recognized from the voice data, information indicative of the one sixth command to an application program executed on the electronic device, and
sends, when one of one or more seventh commands different from a fifth command indicative of an end of a continuous voice operation is recognized from the voice data, information indicative of the one seventh command to the application program, the third commands comprising the fifth command and the seventh command.

2. The electronic device of claim 1, wherein, when the first mode is set as an initial state of the voice recognition mode, the processor switches the voice recognition mode from the first mode to the second mode or the third mode in accordance with one of the first commands that is recognized from the voice data.

3. The electronic device of claim 1, wherein the processor
switches the voice recognition mode from the first mode to the second mode when the one first command is recognized from the voice data,
switches the voice recognition mode from the second mode to the third mode when a fourth command included in the second commands is recognized from the voice data, the fourth command being indicative of a start of the continuous voice operation, switches the voice recognition mode from the second mode to the first mode when one of the one or more sixth commands is recognized from the voice data, the sixth command being different from the fourth command, switches the voice recognition mode from the third mode to the first mode when the fifth command is recognized from the voice data, and keeps the third mode set as the voice recognition mode when one of the one or more seventh commands is recognized from the voice data.

4. The electronic device of claim 2, wherein the processor switches the voice recognition mode from the first mode to the second mode when an eighth command included in the first commands is recognized from the voice data, the eighth command being indicative of a start of a voice operation, switches the voice recognition mode from the second mode to the first mode when one of the second commands is recognized from the voice data, switches the voice recognition mode from the first mode to the third mode when a fourth command included in the first commands is recognized from the voice data, the fourth command being indicative of a start of the continuous voice operation, switches the voice recognition mode from the third mode to the first mode when the fifth command is recognized from the voice data, and keeps the third mode set as the voice recognition mode when one of the one or more seventh commands is recognized from the voice data.

5. The electronic device of claim 1, wherein the processor performs the process to recognize one of the one or more first commands from the voice data by using first dictionary data for voice recognition of the one or more first commands when the first mode is set as the voice recognition mode, performs the process to recognize one of the second commands from the voice data by using second dictionary data for voice recognition of the second commands when the second mode is set as the voice recognition mode, and repeatedly performs the process to recognize one of the third commands from the voice data by using third dictionary data for voice recognition of the third commands when the third mode is set as the voice recognition mode.

6. The electronic device of claim 5, wherein the first dictionary data comprises data for voice recognition of an eighth command indicative of a start of a voice operation, the second dictionary data comprises data for voice recognition of a fourth command indicative of a start of the continuous voice operation and the one or more sixth commands to operate the application program executed on the electronic device, and the third dictionary data comprises data for voice recognition of a fifth command indicative of an end of the continuous voice operation and the one or more seventh commands to operate the application program.

7. The electronic device of claim 5, wherein the first dictionary data comprises data for voice recognition of an eighth command indicative of a start of a voice operation and a fourth command indicative of a start of the continuous voice operation, the second dictionary data comprises data for voice recognition of the one or more sixth commands to operate the application program executed on the electronic device, and the third dictionary data comprises data for voice recognition of the fifth command and the one or more seventh commands to operate the application program.

8. The electronic device of claim 1, wherein the processor sends, when one of the one or more sixth commands different from a fourth command indicative of a start of the continuous voice operation is recognized from the voice data, the information indicative of the one sixth command to the application program executed on the electronic device, the second commands comprising the fourth command and the one or more sixth commands.

9. The electronic device of claim 1, wherein the electronic device is a portable wireless device.

10. A control method of an electronic device, the control method comprising:

establishing a wired connection or a wireless connection between the electronic device and a wearable device wearable by a user;

receiving voice data generated by collecting speech of the user from the wearable device;

performing a process to recognize one of one or more first commands from the voice data when a first mode is set as a voice recognition mode;

performing a process to recognize one of second commands from the voice data when a second mode is set as the voice recognition mode;

repeatedly performing a process to recognize one of third commands from the voice data when a third mode is set as the voice recognition mode;

sending, when one of one or more sixth commands included in the second commands is recognized from the voice data, information indicative of the one sixth command to an application program executed on the electronic device; and sending, when one of one or more seventh commands different from a fifth command indicative of an end of a continuous voice operation is recognized from the voice data, information indicative of the one seventh command to the application program, the third commands comprising the fifth command and the seventh command.

* * * * *